(12) United States Patent
Nussbaum et al.

(10) Patent No.: US 7,966,459 B2
(45) Date of Patent: Jun. 21, 2011

(54) SYSTEM AND METHOD FOR SUPPORTING PHASED TRANSACTIONAL MEMORY MODES

(75) Inventors: Daniel S. Nussbaum, Cambridge, MA (US); Mark S. Moir, Windham, NH (US)

(73) Assignee: Oracle America, Inc., Redwood City, CA (US)

( * ) Notice: Subject to any disclaimer, the term of this patent is extended or adjusted under 35 U.S.C. 154(b) by 484 days.

(21) Appl. No.: 11/967,371

(22) Filed: Dec. 31, 2007

(65) Prior Publication Data

US 2009/0172306 A1    Jul. 2, 2009

(51) Int. Cl.
*G06F 12/00* (2006.01)
(52) U.S. Cl. ............... 711/154; 711/147; 711/E12.001
(58) Field of Classification Search .................. None
See application file for complete search history.

(56) References Cited

U.S. PATENT DOCUMENTS

| | | | | |
|---|---|---|---|---|
| 7,669,040 | B2 * | 2/2010 | Dice | 712/225 |
| 2006/0085591 | A1 * | 4/2006 | Kumar et al. | 711/113 |

OTHER PUBLICATIONS

Ageson, Ole, "GC Points in a threaded environment," Sun Labs Technical Report TR-98-70, Dec. 1998.

* cited by examiner

*Primary Examiner* — Kevin Verbrugge
(74) *Attorney, Agent, or Firm* — Robert C. Kowert; Meyertons, Hood, Kivlin, Kowert & Goetzel, P.C.

(57) ABSTRACT

A phased transactional memory (PhTM) may support a plurality of transactional memory implementations, including software, hardware, and hybrid implementations, and may provide mechanisms for dynamically transitioning between transactional memory modes in response to changing workload characteristics; upon discovering that the current mode does not perform well, is not suitable, or does not support functionality required for particular transactions; or according to scheduled phases. A system providing PhTM may be configured to transition from a first transactional memory mode to a second transactional memory mode while ensuring that transactions executing in the first transactional memory mode do not interfere with correct execution of transactions in the second transactional memory mode. The system may be configured to abort transactions in progress or to wait for transactions to complete, be aborted, or reach a safe transition point before transitioning to a new mode, and may use a global mode indicator in coordinating transitions.

20 Claims, 10 Drawing Sheets

SYSTEM AND METHOD FOR SUPPORTING PHASED TRANSACTIONAL MEMORY MODES

BACKGROUND OF THE INVENTION

1. Field of the Invention

This invention relates generally to concurrent access to shared objects, and more particularly, to a system and method for implementing different transactional memory techniques for accessing shared objects during different phases in an execution environment.

2. Description of the Related Art

The multi-core revolution currently in progress is making it increasingly important for applications to exploit concurrent execution in order to take advantage of advances in technology. In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads. Typical concurrent programming practices, such as those based on locks and condition variables, are inadequate for this task. Locks do not compose, and introduce troublesome tradeoffs between complexity, performance, and scalability. Furthermore, locks are subject to deadlock if not used carefully.

Transactional memory is a paradigm that allows the programmer to design code as if multiple locations can be accessed and/or modified in a single atomic step. As typically defined, a transactional memory interface allows a programmer to designate certain sequences of operations as "atomic blocks" and "transactions," which are guaranteed by the transactional memory implementation to either take effect atomically and in their entirety (in which case they are said to succeed), or have no externally visible effect (in which case they are said to fail). Thus, with transactional memory, it may be possible in many cases to complete multiple operations with no possibility of another thread observing partial results, even without holding any locks. The transactional memory paradigm can significantly simplify the design of concurrent programs.

Transactional Memory (TM) allows programmers to use transactional or atomic blocks, which may be considered sequential code blocks that should be executed atomically. In other words, executions of atomic blocks by different threads do not appear to be interleaved. To execute an atomic block, the underlying system may begin a transaction, execute the atomic block's memory accesses using that transaction, and then try to commit the transaction (i.e., to attempt to copy back results of the transaction to shared memory). If the transaction commits successfully, the atomic block's execution seems to take effect atomically at the transaction's commit point. If it fails, the execution does not seem to take effect at all and the atomic block might be retried using a new transaction. It is the responsibility of the TM implementation to guarantee the atomicity of operations executed by transactions.

Transactional memory is widely recognized as a promising paradigm for allowing a programmer to make updates to multiple locations in a manner that is apparently atomic, while addressing many of the problems associated with the use of locks. In general, transactional memory can be implemented in hardware (HTM), with the hardware directly ensuring that a transaction is atomic, or in software (STM) that provides the "illusion" that the transaction is atomic, even though in fact it is executed in smaller atomic steps by the underlying hardware. While HTM solutions are generally faster than STM ones, so-called "best-effort" HTM implementations may not be guaranteed to be able commit any particular transaction, in which case a programmer cannot rely solely on HTM, even if it is almost always effective.

Typically, systems implement or support only a single type of transactional memory implementation. Most existing transactional memory implementations are designed and optimized for one situation, and may not perform well or be applicable in others, e.g., those in different environments, those with different workloads, etc. Recently developed Hybrid Transactional Memory (HyTM) implementations allow transactions to be executed using hardware transactional memory if it is available and when it is effective, or using software transactional memory otherwise. Hybrid transactional memory techniques are described in co-pending U.S. patent application Ser. No. 10/915,502, entitled "Hybrid Software/Hardware Transactional Memory," and naming Mark S. Moir as inventor, which is herein incorporated by reference in its entirety. In the HyTM implementations described therein, both hardware and software transactions include significant overhead in order to facilitate detection and resolution of conflicts between different types of transactions.

SUMMARY

Transactional memory (TM) may support code sections that are to be executed atomically, i.e., so that they appear to be executed one at a time, with no interleaving between the steps of one transaction and another. This may allow programmers to write code that accesses and/or modifies multiple memory locations in a single atomic step, significantly reducing the difficulty of writing correct concurrent programs.

In some embodiments, a compiler may be configured to construct code that allows multiple compatible transaction implementation techniques to be used in the same program (or group of programs) at different times (e.g., during different phases of the execution of an application or applications in an execution environment). Thus, programmers may write transaction code once using familiar coding styles and constructs, but the transaction may be executed according to one of a number of compatible alternative implementation techniques, as determined at runtime. Programmers may not need to write multiple versions of their code in order to exploit alternative implementation approaches, or even be specifically aware of the particular transaction implementations implemented. Instead the transaction code written by the programmer may be translated, replaced or transformed into code that is configured to implement the transactions according to any of various techniques. At runtime, one of the various implemented techniques (e.g., one corresponding to the current transactional memory mode) may be used to effect the transaction and if the first technique fails or is inappropriate for a particular transaction, the system may initiate a transition to another transactional memory mode.

In some embodiments, the compiler may generate calls to a run-time support library to help implement one or more of the alternative versions of the transaction code, to help coordinate transitions between transactional memory modes, to make (or help make) decisions regarding which code path (e.g. alternative transaction technique) to execute at any given time, and/or to make (or help make) decisions regarding if and when the system should initiate a transition to a different transactional memory mode. In other embodiments, a separate (e.g., centralized) mode manager may make decisions regarding a default transactional memory mode, may determine if and when the system should transition to a different transactional memory mode, and/or may coordinate (or help coordinate) transitions between different transactional memory modes. Various factors may help determine which implementation method to use. For example, whether or not (and what kind of) hardware transaction support is available may determine whether or not a hardware transaction implementation is used for a particular transaction or group of transactions. In some embodiments, information regarding what other transaction methods have been used, the performance of different transactions executed in various transactional memory modes, and which of those have succeeded or failed recently, as well as other dynamically determined information, such as current workloads and/or resource allocations, may help determine which transaction method is used during a given phase in the execution environment. In still other embodiments, the system may initiate transitions between two or more transactional memory modes according to a pre-determined schedule of transactional memory mode phases. In various embodiments, a single transactional memory technique may be used to execute (or at least attempt to execute) all transactions while in a given transactional memory mode.

In a phased transactional memory (PhTM) implementation, such as that described herein, transactions may be executed using different transactional memory implementations at different times in the same application, without a requirement that they be compatible with transactions executed in different modes. By eliminating the need for transactions executed in different modes to be compatible with each other, this approach may provide a significant performance and flexibility advantage over previous HyTM implementations. For example, transactions may be executed using best-effort HTM support with performance that is close to that of a significantly more complicated unbounded HTM scheme. Furthermore, by eliminating constraints on the STM, when HTM support is unavailable or ineffective for the current workload, a state-of-the-art STM may be used that does not include the overhead required by previous HyTM systems for coordinating with concurrent HTM transactions. In some embodiments, a system supporting PhTM may allow transitions between different transactional memory modes based on changing workloads or other runtime conditions, in addition to transitions based on transaction failures or lack of hardware and/or architectural support for a given transactional technique. In addition to, or instead of, providing support for transitioning between HTM and STM implementations, a PhTM implementation may provide support for transitioning between any two or more transactional memory modes, e.g., between HTM and HyTM implementations, between STM and HyTM implementations, between two or more different STM or HyTM implementations, or between any combination and/or number of HTM, STM, and HyTM implementations, in various embodiments.

In some embodiments, before transitioning to a different transactional memory mode, the system may be configured to ensure that transactions executing in the current transactional mode will not prevent correct execution of transactions in the new transactional memory mode. For example, in some embodiments, as part of a transition from a first transactional memory mode that supports software-mediated transactions to a different transactional memory mode, the system may prevent new transactions from beginning execution in the first transactional mode, may abort any transactions executing in the first transactional mode that are not in a COMMITTED state, and/or may wait for completion of any transactions executing in the first transactional memory mode that are in a COMMITTED state, before changing a global mode indicator and executing transactions in the new transactional memory mode. In other embodiments, the system may be configured to wait for currently executing transactions to reach another safe transition point before changing the transactional memory mode and executing transactions in the new transactional memory mode. In some embodiments, transactions currently executing in a hardware mode may include a read of a global mode indicator in their transactional scope, and may be aborted in response to a transition to a different transactional memory mode without further need for contention detection or resolution.

BRIEF DESCRIPTION OF THE DRAWINGS

FIG. 8 is a block diagram illustrating an exemplary computer system capable of implementing phased transactional memory, according to one embodiment While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
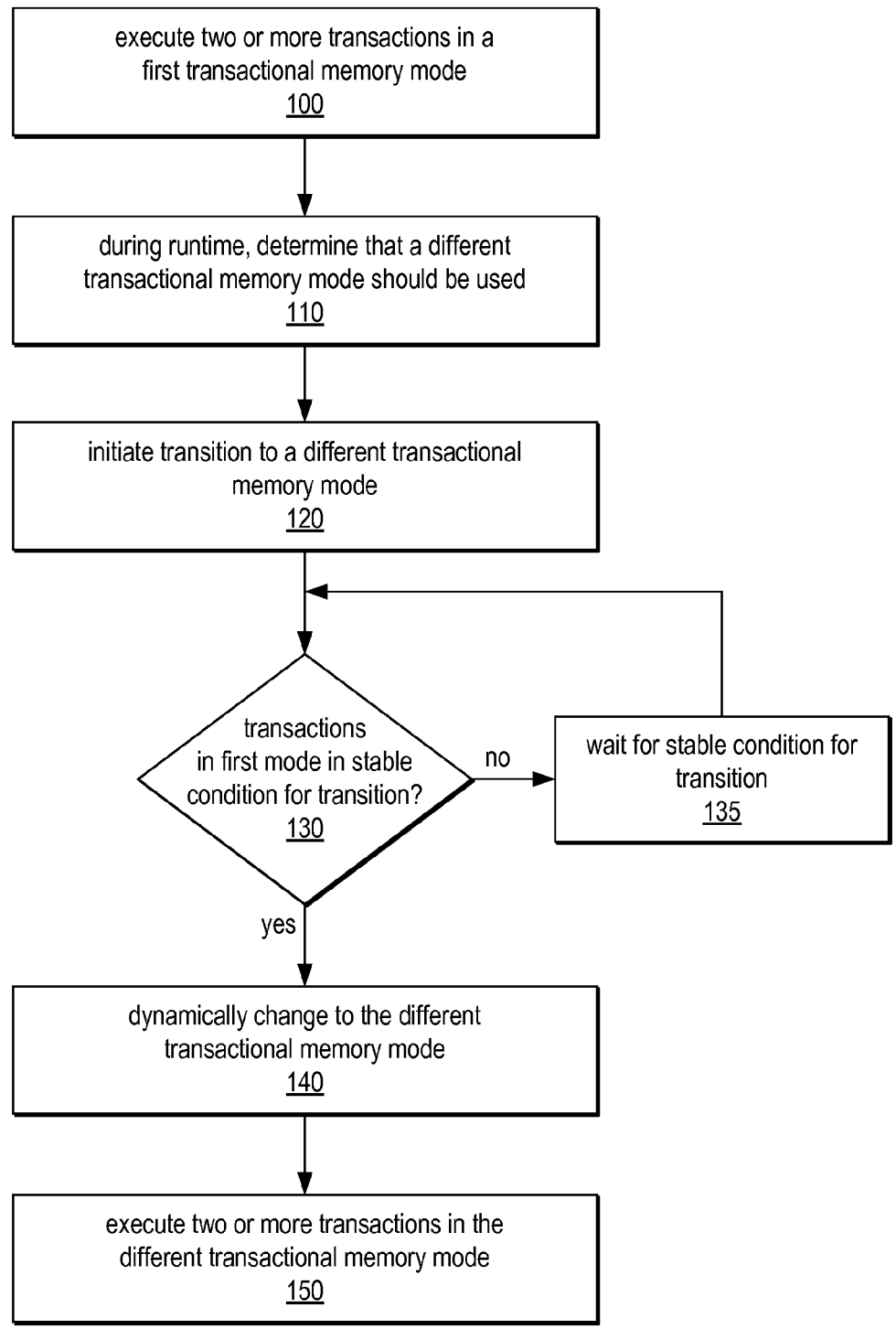
FIG. 1 is a flowchart illustrating one embodiment of a method for implementing phased transactional memory, as described herein.

Transactional memory is widely considered to be the most promising avenue for addressing issues facing concurrent programming and execution. Using transactional memory, programmers may specify what should be done atomically, rather than how this atomicity should be achieved. The transactional memory implementation may then be responsible for guaranteeing the atomicity, largely relieving programmers of the above-mentioned complexity, tradeoffs, and software engineering problems. As noted above, transactional memory may be implemented in hardware, in software, or in a combination of the two, in various embodiments. Hardware transactional memory (HTM) designs may be characterized as unbounded, bounded, or "best-effort" implementations. For example, a bounded HTM may have a fixed-size, fully associative transactional cache, and a transaction may be committed if and only if it fits in that cache. Alternative "best-effort" designs may piggyback on existing caches and other hardware structures such as store buffers, and therefore may be able to commit one large transaction while being unable to commit another significantly smaller one, depending on how the transactions happen to map to the existing structures. Such best-effort HTMs may not be required to make particular guarantees about what transactions can commit, and are therefore substantially easier to design, because difficult corner cases can be handled by simply aborting a transaction.

If used directly, both bounded and best-effort HTM designs may impose unreasonable constraints on programmers because programmers may need to take into account the number or distribution of cache lines accessed by a transaction. Furthermore, the details of such constraints may vary from one machine to another, so programs that must respect those constraints may not be portable. Recently, proposals for "unbounded" HTM have appeared in the literature in an effort to overcome the shortcomings of bounded and best-effort HTM designs. Unfortunately, however, these designs typically entail substantially more complexity than the much simpler best-effort implementations, making them difficult to integrate into commercial processors.

Software transactional memory (STM) implementations, in which the transactional memory is implemented entirely in software without special hardware support, may provide software engineering benefits similar to those provided by HTM. In STM implementations, coordination between conflicting concurrent transactions is mediated using software. Therefore, STM implementations may be built and used in existing systems without hardware modification. Because STM is independent of hardware structures such as caches and store buffers, STM implementations may not be subject to the limitations of bounded and best-effort HTMs described above. However, STM implementations are typically one to two orders of magnitude slower than what can be expected from HTM, and a substantial gap between HTM and STM is likely to remain.

Hybrid Transactional Memory (HyTM) was designed to take advantage of the flexibility and generality of STM, but also to exploit HTM support (if it is available and when it is effective) to boost performance. A HyTM implementation minimally comprises a fully functional STM implementation, because it must work even if there is no HTM support available. Thus, using a HyTM implementation, any transaction can be executed in a software transactional memory mode without special hardware support (e.g., using only instructions that are standard in existing systems). The use of HyTM may allow programmers to develop, test, and execute programs that include transactions using existing systems (i.e., without hardware modification). For example, a program may be written and largely debugged even before HTM support is available in a system targeted for its execution. On the other hand, a HyTM implementation may provide a way to execute transactions using bounded or best-effort HTM support if it is available. This way, significant performance improvements are possible with HTM support if many transactions can be committed by the HTM, even if some must be executed in a software-only mode due to limitations of the HTM support.

In one embodiment of a HyTM system, transactional load and store operations in transactions that are executed using HTM support are augmented with additional code to check for conflicts with concurrent software transactions. This may impose significant overhead on transactions executed using HTM. In some embodiments of HyTM, transactions executed in a software mode may also need to maintain and expose information sufficient to allow transactions executed using HTM to detect conflicts with concurrent software transactions, thereby imposing overhead and constraints on the design of the STM component of the HyTM system.

As previously noted, some transactional memory implementations are more suitable for use in particular architectures, execution environments, workloads, etc., than others. For example, workload characteristics may include the number and/or frequency of transactions executed in a given application, the number of concurrent threads allocated to execution of a given application, the number and/or frequency of other concurrent and/or pending transactions in the execution environment (e.g., transactions that are included in a different concurrent application executing in parallel in the execution environment), the type of actions performed by the transactions in a given application (e.g., whether they include I/O operations or system calls), the size of the transactions, the duration of the transactions, and other characteristics that may affect the suitability of a given transactional memory implementation for the execution environment. However, typical existing transactional memory implementations are designed and optimized for one situation, and may not perform well or be applicable for others.

The system and methods described herein for a phased transactional memory (PhTM) implementation may provide a way to build a system so that transactions successfully executed using bounded or best-effort HTM support performance competitive with that of unbounded HTM, and so that performance of transactions executed in a software-only mode is competitive with that of transactions executed using the fastest available STM systems. The PhTM implementations described herein may provide support for a number of different "modes" for transactional memory, and for dynamically switching between these transaction memory modes in response to changing workload characteristics, or upon discovering that the current mode does not perform well, is not suitable, or does not support functionality required for a particular transaction or set of transactions. In various embodiments, PhTM implementations may provide methods for transitioning between modes in order to use a transactional memory implementation that is better suited to the current workload or to provide functionality not supported by the current mode. For example, a PhTM implementation may support hybrid transactional memory techniques, but may also support transitioning to a hardware-only mode when hardware support is usually effective, or to a software-mediated mode when there is no hardware support or it is ineffective for the current workload. A PhTM implementation may facilitate execution of a single application (including all concurrent threads of the application) using one transactional memory technique at a time, or may facilitate the use of one transactional memory technique for all applications (and corresponding threads) executing in a given execution environment at a given time, in different embodiments.

A PhTM implementation may allow dynamic adaptation between differently optimized transactional memory implementations as well as implementations that support different functionality. For example, in the case of single-threaded or very low-contention workloads, as long as transactions executed are guaranteed not to explicitly abort, transactions may be executed in a transactional memory mode that eliminates virtually all transactional memory overhead, resulting in near-optimal performance. One such mode is described in more detail below. If it is possible for a particular transaction to be explicitly aborted, however, the system may initiate a transition to a different mode. For example, the system may transition to a mode that includes some overhead to provide support for rolling back results of a transaction upon an explicit abort, but that includes no overhead for conflict detection (i.e., because the workload is single threaded). Many alternatives exists, and the PhTM approach described herein may be applied to integration of any suitable transactional memory techniques into one system that can switch modes dynamically in response to changing conditions, needed functionality, etc. By supporting multiple transactional memory modes, a PhTM implementation may facilitate use of a best-case mode for each given environment and workload from among available supported options. Furthermore, by supporting dynamic mode changes, a system may be configured to adapt to changing workload characteristics, and/or to make optimistic assumptions about the environment and workload but to transparently back out of them if they turn out to be incorrect.

A system employing PhTM may support various modes that are optimized for different workload and system support scenarios, and may also allow seamless transitions between these modes. The name Phased Transactional Memory refers to the fact that PhTM may be implemented such that the system operates in one mode for some time, then switches to another, etc. thus executing an application in "phases" in which the system is in a particular mode for each phase. In various embodiments, a PhTM implementation provides one or more methods for:
  identifying efficient modes for various scenarios
  managing correct transitions between modes
  making effective policy decisions regarding when to switch modes One embodiment of a method for implementing Phased Transactional Memory is illustrated by the flow chart in FIG. 1. In this example, it is assumed that a given execution environment supports multiple transactional memory techniques. As illustrated in FIG. 1, two or more transactions may be executed in a first transaction memory mode, as in 100. In some embodiments, the first transactional mode may be a default mode, while in others the first transactional mode may be selectable through application software or by a centralized mode management mechanism (e.g., mode management software). During runtime, it may be determined that a different transactional memory mode should be used, as in 110. In some embodiments, this determination may be made by mode management software according to a time schedule, or dependent on current conditions (e.g., various performance measures, the amount of contention in the system, resource utilization, system configuration, supported features of each mode, or application-specific constraints). Various methods for determining that a transition to a different transactional memory mode should be used are described in more detail below.

Once a determination is made that the transactional memory mode should be changed, a transition to the alternate memory mode is initiated, as in 120. Initiating the transition may in various embodiments involve reading and/or updating one or more variables, counters, or pointers used in managing transitions between modes, as described in more detail below.

For example, in one embodiment, initiating a transition to a new transactional memory mode may involve changing the value of a shared variable that indicates a "next mode" for executing transactions. As illustrated in FIG. 1, before transitioning to an alternate transactional memory mode, the method may include determining if any currently executing transactions are in a stable condition for transition. For example, if a currently executing transaction is in the process of copying back results (e.g., during an attempt to commit the transaction), changing the transactional memory mode may allow another transaction to corrupt this process, e.g., by allowing another transaction to overwrite one or more locations being updated by the process. Therefore, if one or more transactions currently being executed in the first mode are not in a stable condition for the transition, shown as the negative exit from 130, the method may include waiting for them to reach a stable condition before making the transition. This is illustrated as 135 and the feedback to 130. Note that some transactional memory modes may have different requirements for stability before a transition than others, and that not all transitions may require that all currently executing transaction are completed or aborted before a transition may take place. Various methods for managing transitions under stable conditions are described in more detail below.

Once any currently executing transactions reach a stable condition, the method may include dynamically changing the current transactional memory mode to a different transactional memory mode, as in 140. In some embodiments, this may involve changing the value of a shared variable that indicates the current transactional memory mode. After successfully changing the transactional memory mode, two or more additional transactions may be executed in the new transactional memory mode, as in 150. Note that although the examples included herein describe that multiple transactions are executed using each transactional memory mode, in some embodiments, the system and method for implementing Phased Transactional Memory may support transitions between any arbitrary number of transactions, including embodiments in which at least one transactional memory mode allows only one transaction to execute at a time.

Several common and/or likely scenarios encountered in concurrent programming are described below, along with respective transaction memory mode strategies that may be effective for each of them. Persons skilled in the art will appreciate that the invention is not limited to these modes, and that many alternatives and variations are possible.

In one scenario, HTM is available and is almost always effective. For this scenario, an HTM-only mode, referred to as "HARDWARE" mode, may be employed, in which all transactions are executed using HTM support. In this mode, no transactions are executed using software mediation, so there is no need to detect conflicts with software-mediated transactions (e.g., transactions executed in software-only modes or hybrid modes that support software-mediated transactions). Instead, only a mode indicator may need to be checked by hardware transactions, as described herein. Therefore, the overhead described above for checking for such conflicts in a typical HyTM implementation may be eliminated when in this mode. In other words, in HARDWARE mode, the system may in some embodiments operate as if it includes unbounded HTM support with no need to detect conflicts with concurrently executing software transactions.

In another scenario, HTM is unavailable or is ineffective for the current workload. For this scenario, there is little point in attempting to execute transactions using HTM support. Therefore, in this case an STM-only mode, referred to as "SOFTWARE" mode, may be employed, in which all transactions are executed in software and conflicts between transactions are mediated in software. In this mode, the STM design is not constrained to interoperate correctly with HTM transactions. Therefore, in this mode the system may use any STM, including optimized, state-of-the-art STMs that have not been designed to interoperate with HTM and do not include any overhead to support interoperation with HTM transactions. In other words, in SOFTWARE mode, the system may operate as if there is no HTM support, whether or not HTM support exists in the system.

In a third scenario, HTM is available, and is usually effective but is sometimes not effective. In this scenario, it may be worthwhile to support execution of HTM-supported and software-mediated transactions concurrently, in order to avoid frequent mode changes. In this case, both HTM transactions and STM transactions must incur the overhead required to ensure that conflicts between them are correctly detected and resolved, as described above regarding HyTM implementations. When the system operated in such a mode, referred to as "HYBRID" mode, the system behaves similarly to a system employing a (single) HyTM implementation, allowing any transaction to be attempted using HTM support or in a software-mediated transactional memory mode.

In another scenario, the workload is single-threaded, or uses few transactions, and transactions may be explicitly aborted. For this scenario, a special STM mode, referred to as "SEQUENTIAL" mode, may be employed that supports the execution of only one transaction at a time. In this mode, transactions may be required to track transactional stores, so that they may be undone in case the transaction explicitly aborts. However, a thread executing transactions in this mode (and/or one that initiates a transition to this mode) may not be required to support conflict detection, because there can be no concurrent transactions. This may eliminate a significant amount of overhead as compared to other STM modes.

In a similar scenario, the workload is single-threaded, or uses few transactions, but some transactions are known not to abort explicitly. For such transactions, a special STM mode, referred to as "SEQUENTIAL-NOABORT" mode, may be employed that eliminates virtually all transactional memory overhead. As in the previous scenario, a thread executing transactions in this mode (and/or one that initiates a transition to this mode) may not be required to support conflict detection. In addition, because transactions will not abort due to conflict and will not abort explicitly, when transitioning to and/or operating in this mode, a system may not be required to log transactional loads or stores, making the resulting execution essentially the same as sequential execution. This mode may also allow general functionality that might not be supported in other modes, for example executing I/O or system calls (which may not be able to be "undone") within transactions. In one embodiment, if a programmer knows that a given transaction includes one or more stores that cannot be undone (e.g., a store that implements an I/O operation causing an external action), the programmer may write the source code for that transaction so that the transaction will execute in SEQUENTIAL-NOABORT mode (e.g., by including code configured to check the mode before execution and to initiate a transition to this mode if the current mode does not match). In other embodiments, a programmer may include hints in the source code asserting that a given transaction does not explicitly abort (e.g., using code marking, setting a parameter value, etc.), or compiler directives to facilitate the execution of the transaction in SEQUENTIAL-NOABORT mode, in different embodiments. In still other embodiments, the compiler may be able to determine that a given transaction does not, or cannot, explicitly abort. In some embodiments, the system, rather than the programmer, may determine whether or not a SEQUENTIAL-NOABORT mode is appropriate for a given transaction or group of transactions. In such embodiments, programmer hints, directives, etc., as described above, may serve as inputs to the decision making process, (e.g., suggesting the option to use SEQUENTIAL-NOABORT mode) rather than forcing the system to use this mode.

Note that the transactional memory modes described above are merely exemplary and are not meant to be limiting on the implementation of phased transactional memory. A PhTM implementation may support numerous other STM, HTM, and/or HyTM implementations for use in various common and/or specialized concurrent programming and execution scenarios. For example, in various embodiments, a PhTM implementation may support transitions between more, fewer, and/or different transactional memory modes than those described herein.

In different embodiments, a system and method for implementing PhTM may include different mechanisms for ensuring that when a transition to a different transactional memory mode is initiated, the transition is made efficiently and without corrupting pending or future transactions. Because different modes support different transaction implementations, it may be necessary when switching modes to prevent transactions executing in the current mode from compromising the correctness of transactions executing in the new mode, and vice versa. For example, one simple approach may be to ensure that all transactions executing in the current mode are either completed or aborted before allowing transactions in the new mode to begin. This may be achieved in various ways, depending on the characteristics of the current and new modes.

Figure 2:
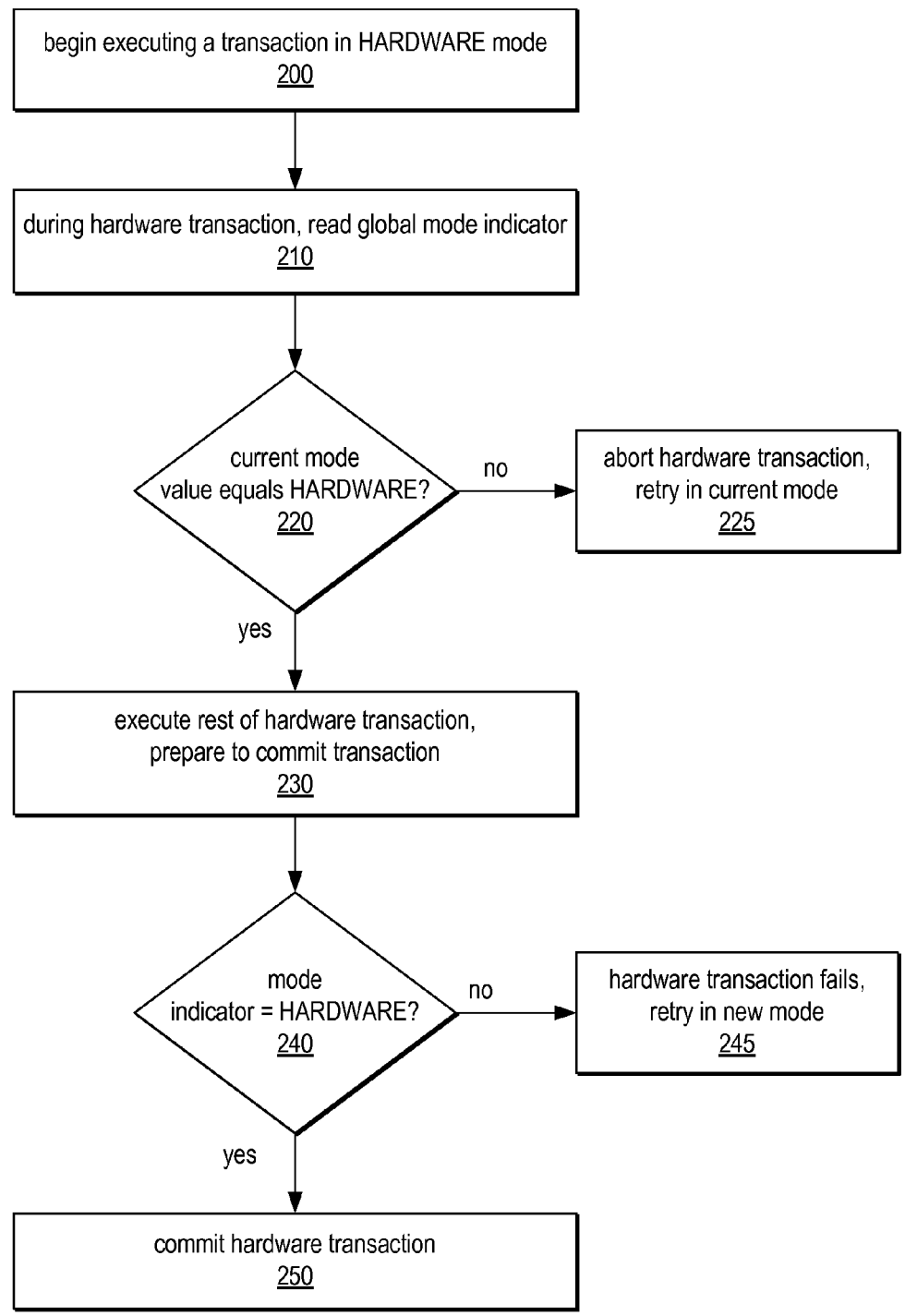
FIG. 2 is a flowchart illustrating one embodiment of a method for transitioning from an HTM-only transactional memory mode to a transactional memory mode supporting software-mediated transactions, as described herein.

As noted above, various transactional memory modes may have different requirements for stability and/or tracking in order to manage conflict between transactions. For example, if the current transaction mode is a hardware mode, such as the HARDWARE mode described above, a transition to a non-hardware mode (e.g., a software-only or hybrid transactional memory mode) may require relatively little preparation and/or tracking. FIG. 2 illustrates such a transition from the HARDWARE mode described above to another transactional memory mode. In this example, execution of a transaction in HARDWARE mode begins, as in 200. During the execution of the transaction (and as part of its transactional scope), a global mode indicator may be read, as in 210, to confirm that the system is in a mode compatible with HTM-only execution, as in 220. If the current mode is not HARDWARE, shown as the negative exit from 220, the hardware transaction may be aborted, as in 225 (e.g., it may abort itself or change its status to ABORT to prevent it from being committed). In some embodiments, the transaction may then be retried in the current transactional memory mode, as illustrated.

In this example, it may be sufficient to check once per transaction that the system is in a mode that allows HTM-only transactions, rather than in a mode that supports a combination of concurrent hardware and software transactions. Having performed this check, it may be safe to execute the rest of the transaction without any additional overhead for conflict checking, as in 230. This is because for hardware transactions, there may only be two possibilities for ending the transactions. If the mode remains unchanged during execution of a transaction (i.e., if the global mode indicator value still equals HARDWARE when the transaction is ready to commit, shown as the positive exit from 240), the hardware transaction will successfully commit the results of its execution to memory. On the other hand, if the global mode indicator value has changed during execution of a hardware transaction (shown as the negative exit from 240), this will cause the hardware transaction to fail.

As illustrated in FIG. 2, a conflict-checking mechanism for a transition from a hardware transactional memory mode to a non-hardware transactional memory mode may entail very low overhead because it may involve a single load of a variable that is read-only during HARDWARE phases. In addition, this check may only need to be performed once per transaction, not once per memory access as in some hybrid transactional memory implementations. Note that in some embodiments, if the current transactional memory mode is a hybrid mode, such as the HYBRID mode described above, transactions executed using HTM may use the same technique to ensure that they execute in a compatible mode. However, an additional check may be needed to detect and manage conflicts with software transactions, in some embodiments.

A transition to a new transactional memory mode may be more complicated when the current transactional memory mode supports software transactions (either in an STM-only mode, such as the SOFTWARE mode described above, or in a mode that supports both hardware and software transactions, such as the HYBRID mode described above), and when the system has elected to execute one or more transactions in software. Before switching from a mode that supports software transactions to a different mode (e.g., one that does not allow them, or one that supports a different form of them), the system may need to ensure that each transaction currently executing in software cannot take any action that would compromise the correctness of transactions executing in a different mode. One simple approach may be to prevent new transactions from starting in a software mode, and to wait for all transactions already executing in software mode to complete before transitioning to a new transactional memory mode (whether or not the new mode supports software transactions). An example of one such embodiment is described below. Persons skilled in the art will appreciate that a variety of approaches may be used to prevent software transactions from interfering with transactions executed in a new mode, even if they do not complete. In some embodiments, these approaches may depend on the particular STM implementation since different STM implementations may employ different conflict management and coordination mechanisms that are incompatible with those of other modes.

In one example, an STM transaction buffers its changes to memory in a local "write set" (i.e., a set of address-value pairs), acquires exclusive ownership of all locations to be modified, validates any reads performed, and then attempts to atomically switch its status from ACTIVE to COMMITTED. If this is successful, competing transactions can no longer abort the transaction, so the transaction copies the values from its write set to memory and then releases its ownerships. In such systems, a successful transaction may be deemed to take effect at the beginning of the read validation. From this point until the point at which the transaction copies back a value from its write set to a given memory location, the "logical" value of the location differs from its physical contents, because the transaction is deemed to have taken effect but the value written to the location has not yet been stored there. In this interval, it may not be safe to execute a transaction that accesses this memory location using a hardware transaction that does not check for conflicts with software transactions.

Figure 3:
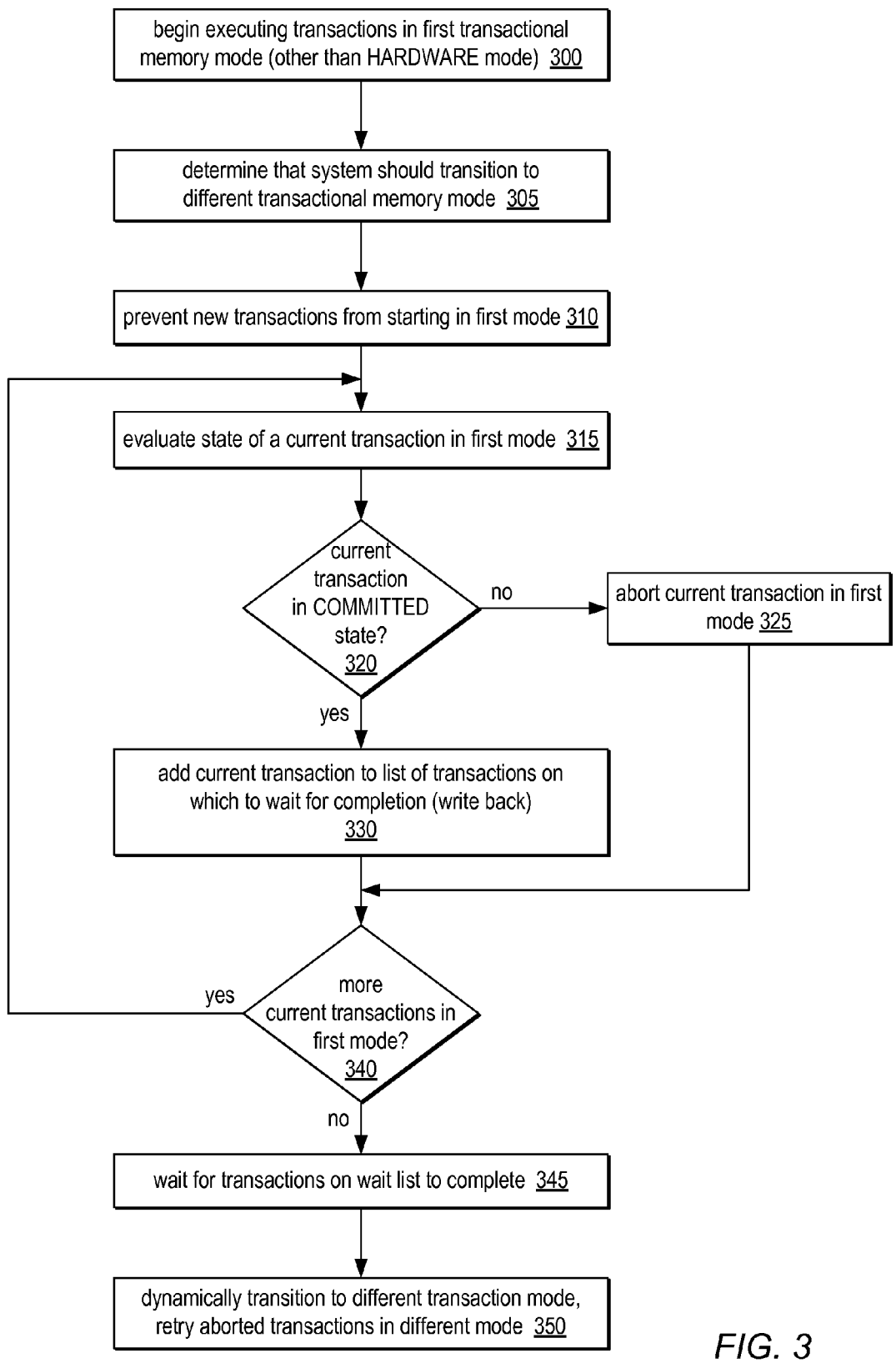
FIG. 3 is flowchart illustrating one embodiment of a method for transitioning from a transactional memory mode other than an HTM-only mode to another transactional memory mode, as described herein.

In the embodiment described above, in order to safely transition from a mode that allows software transactions to a mode that allows hardware transactions, it may be necessary to ensure that no software transaction is in or will enter this interval during the transition for any memory location. In some embodiments, this may be achieved by simply waiting for all software transactions to complete before transitioning to a new transactional memory mode. In another embodiment, this may be achieved by the system aborting all software transactions that have not yet switched their status to COMMITTED, and preventing any new software transactions from starting before the transition is complete, as discussed above. One such embodiment is illustrated in FIG. 3. In this example, the current transactional memory mode may be any mode other than an HTM-only mode. The system may begin executing transactions in this first transactional memory mode, as in 300. At some point, it may be determined that the system should transition to a different transactional memory mode, as in 305. Various mechanisms for determining when to transition to a different transactional memory mode are described in more detail below. As discussed above, when beginning a transition to a new transactional memory mode, the system may prevent any new transactions for starting using the first transactional memory mode, as in 310.

In order to prevent currently executing transactions from interfering with transactions that will execute in the new transactional memory mode, the method may include iterating over all active software transactions to evaluate their status. This is illustrated in FIG. 3 as the loop from 315 to 340. As described above, in some embodiments, any currently executing transactions that are not in a COMMITTED state (shown as the negative exit from 320) may be explicitly aborted, as in 325. Note that in other embodiments, a "safe point" mechanism may be employed, in which, with compiler support, each transaction may determine whether there has been a mode change made within a given time period (not shown). If so, the transaction may abort itself. Other variations are possible.

As discussed above, for currently executing transactions whose status is COMMITTED, a simple option may be to wait for them to complete. This is illustrated in FIG. 3 as the positive exit from 320. In this example, currently executing transactions that are in the COMMITTED state may be added to a list of transactions on which to wait for completion before completing the planned transition to a new transactional memory mode, as in 330. After waiting for the transactions on the wait list to complete, as in 345, the method may include dynamically transitioning to a different transactional memory mode, as in 350. In some embodiments, after the transactional memory mode has been changed, any aborted transactions may be retried in the new transactional memory mode, as illustrated.

Waiting for currently executing transactions that are in the COMMITTED state to complete may in some embodiments be more predictable (and/or less likely to negatively affect performance) than waiting for a transaction that is potentially executing user transaction code to complete. This is because a committing transaction is already running code that is part of the STM implementation, and thus the system may be configured to control and/or predict how long the system waits for it. With a little more sophistication and system support, various other alternatives exist. For example, in some embodiments, if the HTM can guarantee that certain small and simple transactions will (eventually) succeed in committing, the system may perform the copy back from software transactions using this HTM support in such a way that another thread (e.g., one performing a mode switch) may ensure that subsequent attempts to complete the copy back will fail. In such embodiments, the method transitioning from a mode that allows software transactions to a hardware-only mode may be much simpler and more efficient than a method for performing a similar transition in an embodiment that does not include such a guarantee.

Another alternative to aborting a transaction to prevent it from committing in an incompatible mode may be to pause the transaction during a transition to an incompatible mode, and ensure that it does not resume execution before the system transitions to a mode compatible with the transaction (e.g., back to its original mode or to a different compatible mode). Such a mechanism may be desirable, for example, to allow long-running software transactions to execute across multiple mode changes. Pausing a transaction may in some embodiments be achieved, for example, by changing a transaction's status from ACTIVE to PAUSED. In such embodiments, the transaction may then be responsible for checking that the system is in a compatible mode before resuming execution. Depending on the STM implementation, other steps may be needed to ensure correctness. For example, in some embodiments, the transaction may need to validate reads performed so far (e.g., before pausing) in case values previously read by the transaction have since been overwritten by another transaction mode that does not detect a conflict with the paused transaction. In such embodiments, if values have been overwritten, the transaction may be aborted (e.g., rolled back) and may be retried.

A system and method for supporting phased transactional memory may be applicable in execution environments supporting any number of different hardware, software, and/or hybrid transactional memory modes. For example, in one embodiment, a system may support only two modes, a single HTM mode and a single STM mode (which may be similar to the SOFTWARE mode described above). Such an embodiment may employ a relatively simple mechanism for coordinating transitions between modes, as illustrated by way of example in FIG. 4. Note that in some embodiments, one or more shared variables or counters may be used to track and/or coordinate the execution of transactions in the two transactional memory modes. In the example illustrated in FIG. 4, the mode changing mechanism is based on the use of a single, globally shared modeIndicator variable, which contains three fields, as follows:

modeIndicator=(mode, DeferredCount, UndeferredCount)

When in HARDWARE mode, the field DeferredCount may represent the number of transactions that must be executed in software after the next mode transition. When in SOFTWARE mode, it may represent the number of these transactions that have not yet succeeded. In this example, the UndeferredCount may represent the number of other transactions currently executing in software (i.e., software transactions that were not deferred from a previous hardware-only phase). Note that in this example, the value of UndeferredCount may always be zero when in HARDWARE mode. In this example, the ability to atomically update any or all of the fields of modeIndicator is assumed. For example, in some embodiments, the fields of modeIndicator may be stored together in a word or long word (e.g., a 16-, 32- or 64-bit word) and modified using a corresponding compare-and-swap (CAS) instruction. In other embodiments, a similar mechanism may be adapted to other architectures, such those supporting load-linked and store-conditional instructions (i.e., LL/SC operation pairs). Persons skilled in the art will appreciate a variety of alternate approaches in the case that various fields of modeIndicator may not be atomically updated together in a particular execution environment.

Figure 4:
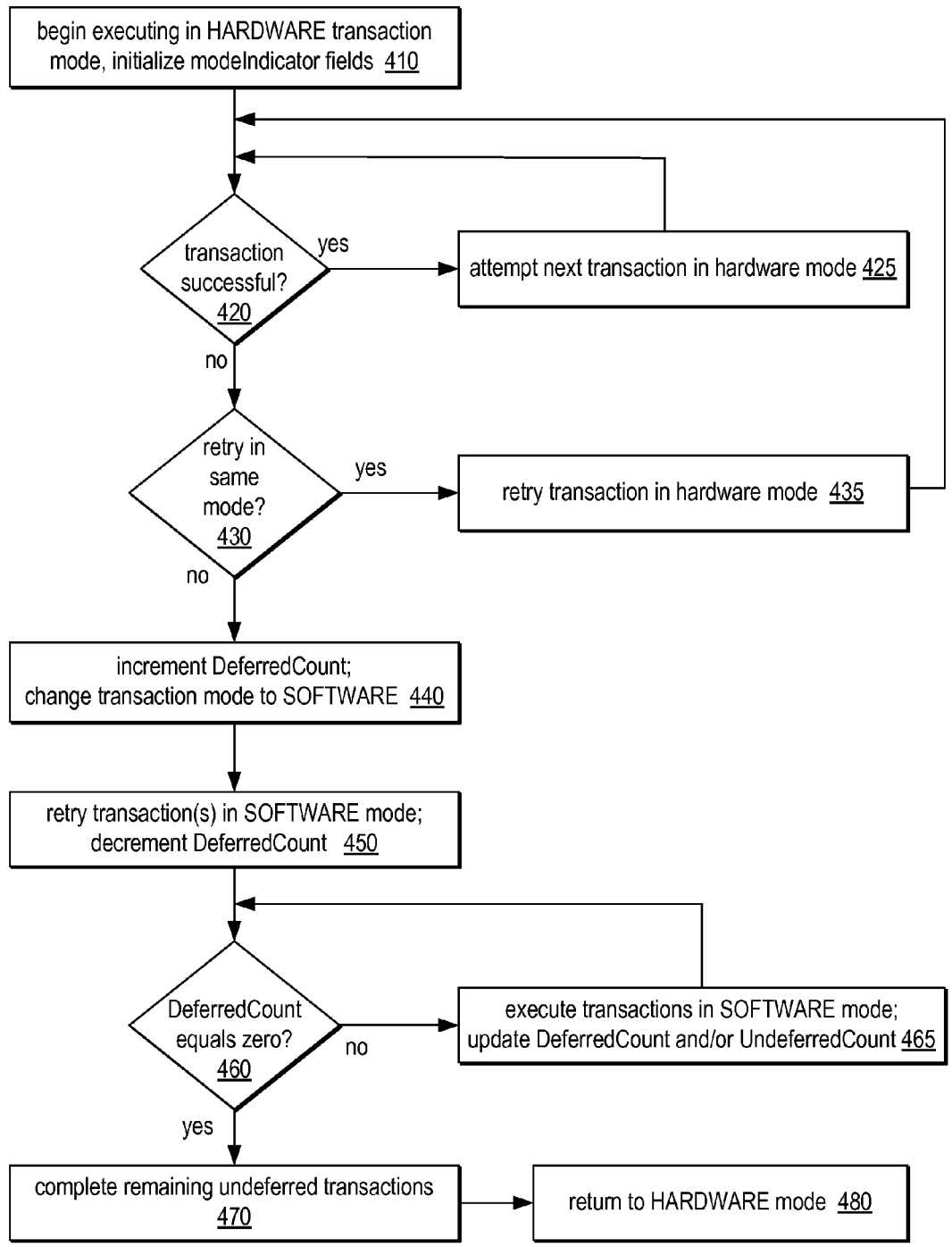
FIG. 4 is a flowchart illustrating one embodiment of a method for executing a transaction including both hardware and software transaction support.

In the example illustrated in FIG. 4, the system is initially in an HTM-only mode, such as the HARDWARE mode described above. While the system remains in HARDWARE mode, every transaction encountered may be attempted as a hardware transaction, (e.g., a called library function may direct every transaction to execute using the hardware path in its code). Each HTM transaction may include a function that reads the modeIndicator to confirm that the mode is HARDWARE, as described above, and may proceed with the transaction, as in 410. Note that in this example, before executing one or more transactions in HARDWARE mode, one or more fields of the modeIndicator variable may be initialized, as shown in 410.

In some systems, all transactions may be successfully executed using HTM. In other systems, however, a transaction may be encountered that cannot be committed using best-effort HTM, in which case the system may need to switch to SOFTWARE mode to complete the transaction. This is illustrated in FIG. 4. In this example, as long as transactions are successfully executed using HTM, shown as the positive exit from 420, transactions may continue executing in HARDWARE mode, as in 425.

When an HTM transaction is unsuccessful for some reason, the system may decide (using, e.g., another library function call) whether to retry in the transaction in hardware or to initiate a transition to SOFTWARE mode before retrying. In various embodiments, this decision may be made based on a variety of factors, including feedback from the HTM implementation indicating the reason for the failure, such as whether it was caused by contention or by exceeding the best-effort HTM's resource constraints. For example, in some embodiments retrying a failed transaction in hardware (after a short delay) may be a reasonable approach when a failure is due to contention, but not when it is due to exceeding the resources of the best-effort HTM. In other embodiments, the HTM implementation may not provide any such feedback. Therefore, when a transaction's resource needs cause the hardware transaction to fail, the HTM implementation may fruitlessly retry the failed transaction several times (e.g., according to a pre-defined parameter) before initiating a transition to SOFTWARE mode. In other embodiments, a single failure to execute in HARDWARE mode may trigger a transition to SOFTWARE mode. In the example illustrated in FIG. 4, if a transaction does not complete successfully, shown as the negative exit from 420, it may be retried one or more times in HARDWARE mode, as in 435.

After retrying a failed transaction in HARDWARE mode one or more times (depending on the particular implementation), it may be determined that a transition to SOFTWARE mode is appropriate. As discussed above, in some embodiments, this determination may be made by a central mode control mechanism, such as a "mode manager" software module that considers resource, performance, and/or scheduling criteria in making the determination. In other embodiments, this determination may be made by the failing transaction itself (e.g., after a pre-defined number of HTM failures). In the example illustrated in FIG. 4, when a transaction or mode manager decides to initiate a transition to SOFTWARE mode, it may attempt to increment DeferredCount (while confirming that the mode is still HARDWARE) before transitioning to SOFTWARE mode. This is shown in 440. In this example, transitioning to SOFTWARE mode may involve changing the value of the mode field of ModeIndicator from HARDWARE to SOFTWARE, as in 440. Note that in some embodiments, the method may include waiting for a short time before atomically changing the mode to SOFTWARE (if this has not occurred already) while keeping DeferredCount and UndeferredCount unchanged (e.g., using a CAS instruction or an LL/SC operation pair).

In this example, once the mode becomes SOFTWARE, the failed transaction may be retried using STM, as in 450. For example, in some embodiments, a library function may direct that execution of the failed transaction be retried using a software path in its code. Note that in this example, any transactions that incremented DeferredCount (e.g., upon failing) may decrement DeferredCount when they complete, as shown in 450. In this example, the system may remain in SOFTWARE mode as long as DeferredCount is nonzero. During this phase, additional transactions may execute in SOFTWARE mode, as in 465. In this example, each of these transactions may increment UndeferredCount (while confirming that the mode is SOFTWARE and DeferredCount is nonzero) before proceeding with their execution, and may decrement UndeferredCount upon completion.

In some cases (e.g., depending on workload and environment), it may be desirable to return to HARDWARE mode at some point, so that the system may take advantage of any performance benefits of HTM. In other cases, however, it may be appropriate to simply remain in SOFTWARE mode indefinitely. For example, if it is determined that a best-effort HTM is rarely (or never) successful, the system may remain in SOFTWARE mode. In other embodiments, the system may be configured so that it always eventually returns to HARDWARE mode (e.g., after all remaining undeferred transactions have been completed in SOFTWARE mode). This is illustrated in FIG. 4 as the positive exit from 460, followed by 470 and 480.

Note that in some embodiments if a transaction decrements one of the counters to zero while the other is zero, this may result in a transition back to HARDWARE mode. Also note that in some embodiments, a transaction that attempts to increment UndeferredCount but cannot (e.g., because DeferredCount is zero), may simply wait for the mode to become HARDWARE again before proceeding. In this case, after all of the deferred transactions complete, no new undeferred transactions may begin. Thus, the system may return to HARDWARE mode once all currently pending undeferred transactions have completed.

Figure 5A:
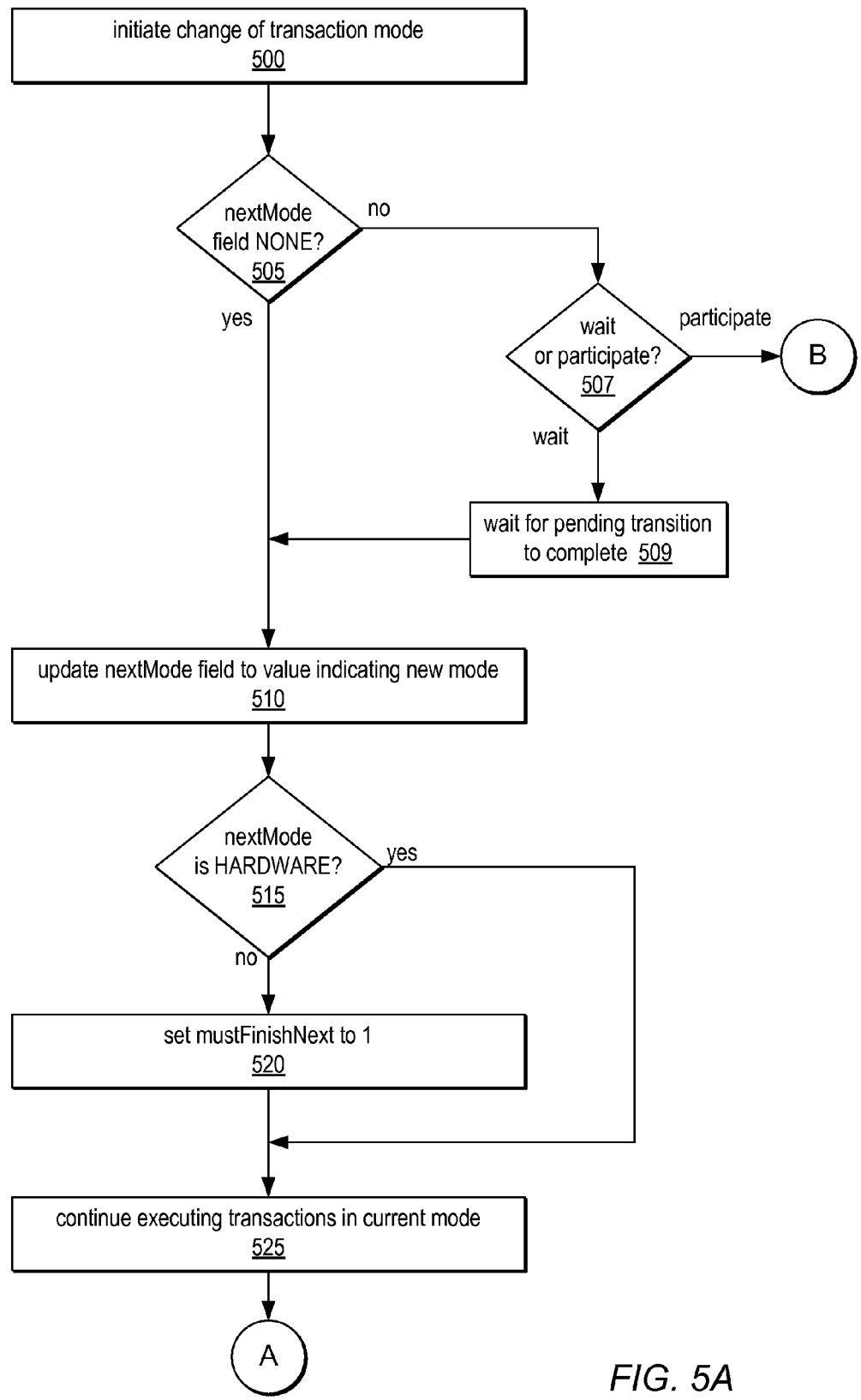
FIGS. 5A-5C illustrate one embodiment of a method for implementing different transaction methods and for coordinating transitions between them.
Figure 5B:
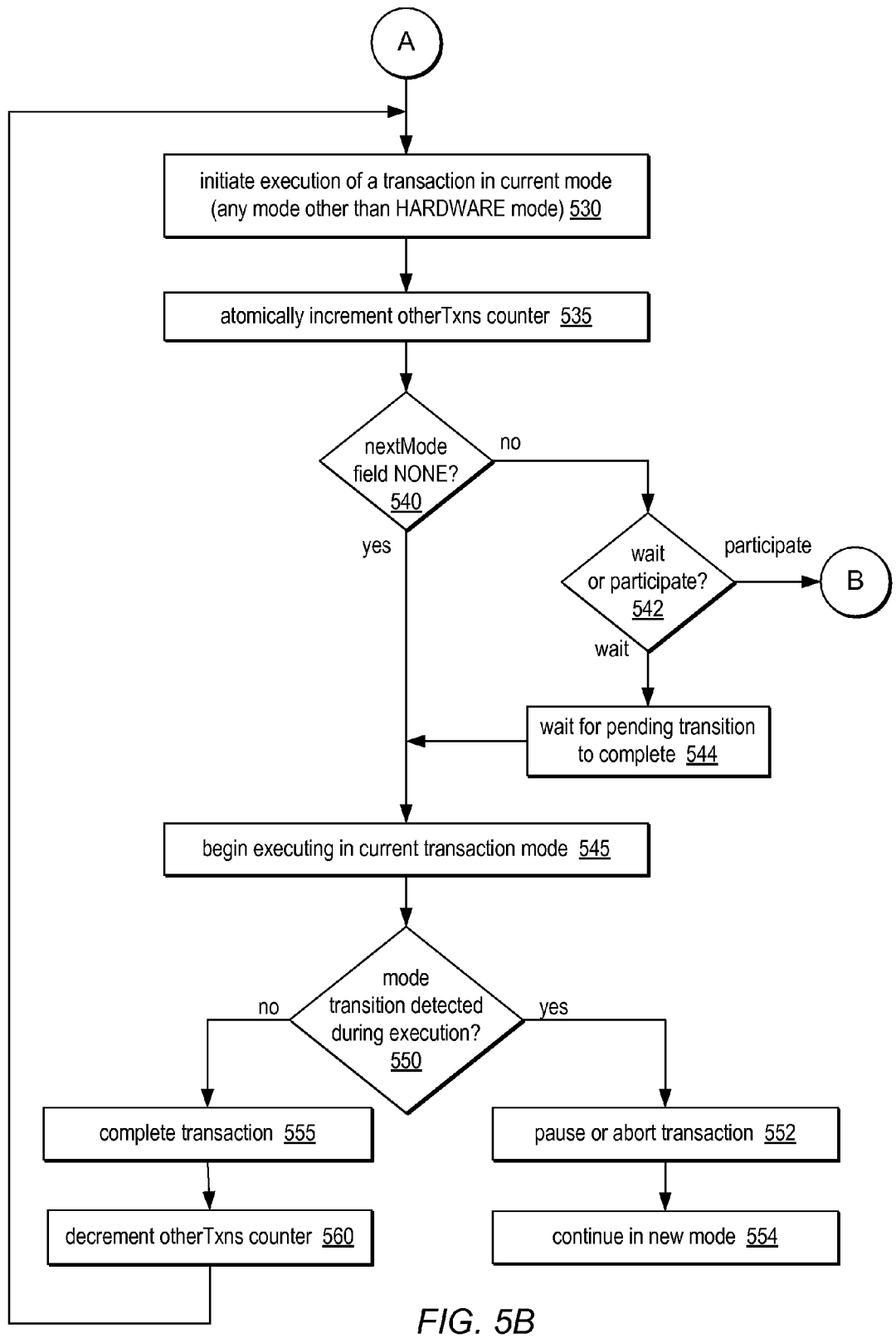
Figure 5C:
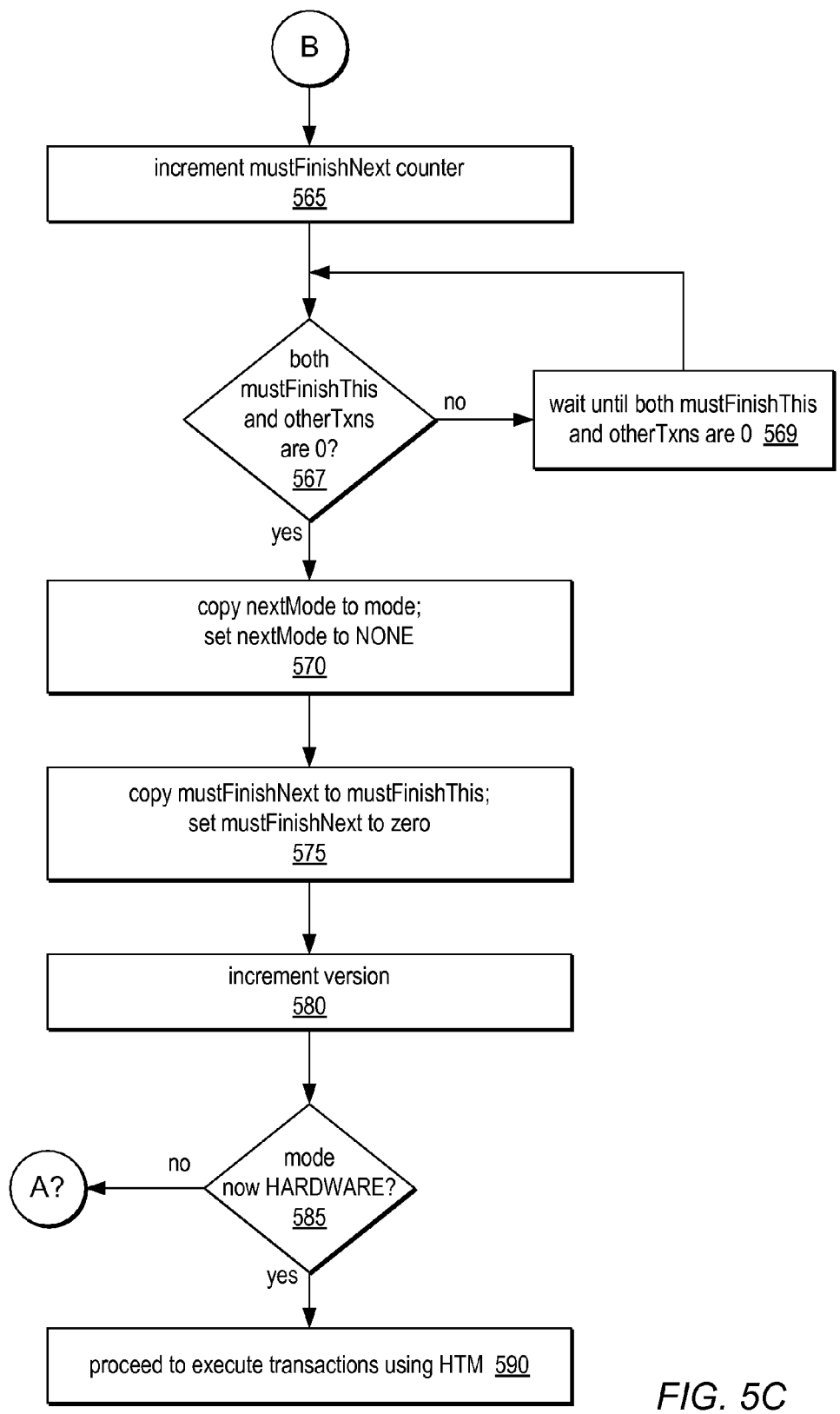

The techniques disclosed herein for supporting phased transactional memory are illustrated by way of another example in FIGS. 5A-5C. In this example, the system supports the HARDWARE, SOFTWARE, and HYBRID modes described above. Note that persons skilled in the art may easily adapt this system to include other modes, such as the SEQUENTIAL and SEQUENTIAL-NOABORT modes described above, or any other variations of STM, HTM, and/or HyTM implementations.

In the example illustrated in FIGS. 5A-5C, the mode changing mechanism is based on the use of a single, globally shared modeIndicator variable containing six fields, as follows:

modeIndicator=<mode, mustFinishThis, otherTxns, nextMode, mustFinishNext, version>

As in the previous example, it is assumed that multiple fields of modeIndicator may be atomically updated (e.g., using a compare-and-swap type instruction or an LL/SC operation pair). Again, persons skilled in the art will appreciate a variety of alternate approaches in the case that various fields of modeIndicator may not be atomically updated together in a particular execution environment. The fields of modeIndicator, for this example, are described below.

"mode" indicates the current transaction execution mode, i.e., HARDWARE, SOFTWARE, or HYBRID.

"mustFinishThis" represents a count of the number of transactions that must complete in this mode before a transition is made to the next mode. This field may be used to throttle thrashing between modes, for example by ensuring that the transaction or transactions that participated in the switch to this mode complete in this mode before the mode is changed again.

"otherTxns" represents a count of the number of transactions executing in this mode, excluding those counted in mustFinishThis. This field may be used in modes that require all transactions executing in that mode to indicate that they have aborted or paused (as appropriate) prior to a change of mode.

"nextMode" indicates one of the above modes as the next mode to switch to. Note that the value of nextMode may indicate NONE when no mode transition is in progress.

"mustFinishNext" represents a count of the number of transactions involved in switching to the next mode. In this example, these are the transactions that must complete in the new mode (i.e., the mode indicated by next-Mode) after the transition to the new mode.

"version" represents a version number that is incremented with every mode change. In some embodiments, the version number may be used to avoid the so-called ABA problem, in which a transaction twice observes the same value in all other fields of modeIndicator, and incorrectly concludes that modeIndicator did not change between the two observations. The version number may not be strictly necessary in the example embodiment illustrated in FIGS. 5A-5C, but is described here for completeness. Note that embodiments that separate the mode indication from other components of the algorithm (as described below) may be more likely to require a version number. For example, a version number may be used to prevent "old" mode change attempts from succeeding.

The operations performed as part of a mode transition in this example may depend on the current transactional memory mode and/or the transactional mode to which the system changes. Therefore, before describing the mode transition mechanism, various mode-specific considerations are explained below, according to this embodiment.

As noted above, in HARDWARE mode, transactions begin a hardware transaction, read modeIndicator to confirm that it still indicates HARDWARE mode (aborting if not), and then execute the transaction in the hardware transaction, without explicitly checking for conflicts with other transactions. This minimal conflict management mechanism may be sufficient because in this mode all transactions are executed using HTM support, and conflict detection and resolution are handled in hardware. If the mode changes before a transaction completes, the hardware will cause the transaction to abort because it has read modeIndicator at the beginning of the transaction, making it part of the transactional scope. Note that a similar mechanism is illustrated in FIG. 2 as described above.

If the transactional memory mode is SOFTWARE, and if a transaction did not participate in the transition to the current mode, the transaction must atomically increment the otherTxns counter to indicate its presence before executing the transaction using STM. If the nextMode field is not NONE (i.e., if a mode transition has already been initiated), then the transaction may either wait for the mode to change before executing (i.e., executing in the new mode after the transition), or it may participate in the already-initiated mode change, as described below. Because no hardware transactions execute in SOFTWARE mode, there may be no need to facilitate the detection of conflicts between hardware and software transactions, so the design of the STM may be largely unaffected by its inclusion in a PhTM system. There may be, however, some small changes necessary, which are applicable to any STM system, in this embodiment. Specifically, upon completion, a transaction must report its completion, either by decrementing the mustFinishThis counter (in case it participated in the transition to the current mode) or the otherTxns counter (in the case that it did not participate in the transition to the current mode). Furthermore, to facilitate faster mode changes, in some embodiments transactions (other than those that initiated the previous mode change) may abort or pause before completion upon observing that a mode change has been initiated (i.e., nextMode is not NONE). This may be achieved in any number of ways, such as by checking modeIndicator coincident with transactional loads and stores, on backwards branches, or at compiler-supported safe points, etc. Once the transaction has aborted or paused, it may decrement otherTxns to reflect this.

In HYBRID mode, transactions may be attempted either using hardware transactions or software transactions, each modified to facilitate the detection and resolution of conflicts with the other. For example, in one embodiment, hardware transactions are instrumented to detect conflicts with software transactions, and software transactions maintain state sufficient to facilitate such detection. To allow integration with a PhTM system, HYBRID transactions executed in hardware may additionally read modeIndicator once at the beginning of the transaction to confirm the HYBRID mode (as described above for HARDWARE mode) in order to ensure that they abort upon a mode change. Similarly, transactions executed in software may be coordinated using the mustFinishThis and otherTxns counters, as described above for SOFTWARE mode. This way, the system may ensure that no transaction (hardware or software) executed in HYBRID mode interferes with transactions executed in subsequent modes.

In the example illustrated in FIGS. 5A-5C, the initial transactional memory mode may be a default mode (e.g., in some embodiments, the default transactional memory mode may be HARDWARE), the initial value of nextMode is NONE, and all other fields are zero. When a transaction begins, it may check the current mode by taking a snapshot of modeIndicator. The transaction may then either attempt to execute in the mode indicated or may choose to change the mode, depending on policy decisions driven by a host of potential factors, including but not limited to: knowledge of the application or transaction (e.g., based on information provided by the programmer, the compiler, or via command line options), knowledge of the success or failure of previous transaction attempts in this mode, and/or past performance of transactions in this mode (e.g., contention rates, store buffer utilization, commit/abort rates, etc.) How transactions execute, and whether (and/or how) they initiate or participate in mode changes may depend on the current mode, the contents of modeIndicator, and/or, the next desired mode, according to different embodiments. In the example illustrated in FIGS. 5A-5C, the transaction initiates a change of mode, as in 500 of FIG. 5A. Generally, if the nextMode field is already set to a mode other than NONE, shown as the positive exit from 505, the transaction must either wait for the mode change to occur, or participate in it, as in 507. In some embodiments, transactions may always wait for a pending mode transition to complete (as in 509) or may always participate in a pending mode transition (as described in more detail with reference to FIG. 5C beginning with letter B), while in other embodiments, both options may be supported, dependent on various factors. In still other embodiments, a pending mode transition may be overridden by ignoring a transition in progress and changing directly to a new mode (not shown).

If there is no pending mode transition, or if a previously initiated mode transition has been allowed to complete, the transaction may initiate its mode change by atomically changing the value of the nextMode field of modeIndicator from NONE (or another value if a previously initiated transition was allowed to complete first) to whatever mode is desired, as in 510. Depending on the target mode, the transaction initiating a mode change may also set mustFinishNext to 1, indicating that it must complete before the subsequent mode change occurs. This is illustrated in FIG. 5A as the negative exit from 515 and element 520. This mechanism for throttling mode changes may only be appropriate if the transaction is guaranteed to be able to complete in the target mode. For example, if the transaction has initiated a change to HARDWARE mode (shown as the positive exit from 515), best-effort HTM support may be unable to commit the transaction, making it inappropriate to wait until this occurs. In other embodiments, the transaction may always set mustFinishNext to 1 regardless of such guarantees. However, in such embodiments, the transaction may not be able to complete in the next mode, and may eventually relinquish its right to complete by decrementing mustFinishThis (in the next mode) in order to allow subsequent mode changes. In this example, once the nextMode field has been updated and the mode transition initiated, the execution of transactions in the current mode may continue until it is safe to complete the transition, as in 525. The example illustrated in FIGS. 5A-5C continues at letter A of FIG. 5B.

As illustrated in FIG. 5B, and discussed above regarding SOFTWARE and HYBRID modes, when execution of a transaction in the current mode (other than HARDWARE mode) is initiated, as in 530, the transaction may atomically increment the otherTxns counter of modeIndicator, as in 535. If there is a pending mode transition, the transaction may wait for it to complete or participate in the transition, as described above in reference to FIG. 5A. This is illustrated as 540-544 of FIG. 5B. If there is no pending mode transition or if a pending mode transition has been allowed to complete, execution of transactions in the current mode may continue, as in 545.

In this example, if a mode transition is detected during execution of a transaction in the current mode, shown as the positive exit from 550, the transaction may be paused or aborted, as described above. This is illustrated as 552. Execution of transactions may then continue in the new mode, as in 554. If no mode transition is detected during execution, shown as the positive exit from 550, the transaction may be allowed to complete and the otherTxns counter of modeIndicator may be decremented to reflect that the transaction completed, as in 560. As long as no mode transition is detected during execution of transactions in the current mode, the operations illustrated in FIG. 5B may be repeated for subsequent transactions. This is indicated by the feedback loop from 560 to 530.

For the example embodiment of FIGS. 5A-5C, participation in a mode change that has already been initiated is illustrated in FIG. 5C, beginning at letter B. In this example, a transaction participating in a pending transition may increment mustFinishNext, thereby becoming one of the transactions that must complete in the next mode. This is shown as 565 in FIG. 5C. Alternatively (or in addition) the transaction may atomically change the mode (i.e., to complete the indicated transition). Note that the transaction may only be allowed to complete the transition if both mustFinishThis and otherTxns are zero. This mechanism, shown as a feedback loop from the negative exit of 567 to element 569, and back to 567, may be used to prevent ongoing transactions executing in the current mode from interfering with transactions executed in the next or subsequent modes.

In the example illustrated by FIGS. 5A-5C, completing the mode transition may be performed by copying nextMode to mode and setting nextMode to NONE (shown as 570); copying mustFinishNext to mustFinishThis and setting mustFinishNext to zero (as in 575); and incrementing the version field (as in 580). In this example, if the new mode is not HARDWARE, shown as the negative exit from 585, execution may continue as shown in FIG. 5B, beginning at letter A. Otherwise, the system may proceed by executing subsequent transactions using HTM, as in 590 and as described herein. Note that in some embodiments, for modes that may be unable to commit a given transaction, the transaction may not increment mustFinishThis. Instead, the transaction may simply set nextMode to the target mode, and then wait until mustFinishThis and otherTxns are both 0 before changing the mode and retrying the transaction in the target mode.

The systems and methods described above are merely examples of systems employing phased transactional memory, and are not meant to limit the invention in any way. Various modifications, additions, and improvements are possible. For example, the system and method for providing a PhTM implementation may provide support for any number and type of transactional memory modes and for transitioning between any two or more transactional memory modes, e.g., between HTM and STM implementations, between HTM and HyTM implementations, between STM and HyTM implementations, between two or more different STM or HyTM implementations, or between any combination and/or number of HTM, STM, and HyTM implementations, in various embodiments. Note that in some embodiments, a transition between two transactional memory modes that employ variants of a single transactional memory technique may not require that pending transactions in the first mode be completed (or aborted) before transitioning to the second mode. For example, if the first mode uses a software-mediated technique that aggressively acquires ownership records for contended memory locations accessed by its transactions and the second mode uses a software-mediated technique that waits for one or more transactions to commit before acquiring ownership of contended memory locations, there may be no need to abort transactions currently executing in the first mode before transitioning to the second mode, as transactions may execute concurrently in these two modes, and may resolve any conflicts between them, without corrupting each other.

In some embodiments, some mode transitions as described above may be merged. For example, in some embodiments if nextMode is NONE and mustFinishThis and otherTxns are both zero, a single transition may be used to change to the next mode, setting mustFinishThis to zero or one according to the guarantees made by the target mode, as described above. Alternatively, some mode transitions may be split into two or more transitions. For example, splitting a transition may allow coordination between threads to facilitate waiting a certain amount of time before preventing more transactions from starting in the current mode, or may facilitate performing some clean up work after transactions in one mode have all been completed, but before transactions in another mode begin.

One example of such clean up work might serve to effect privatization. Privatization may require the system to ensure that there are no pending modifications to some data before allowing that data to pass out of the transactional domain (e.g., before allowing it to be accessed by non-transactional code). A common reason for needing to privatize some data is to free it. Common solutions to privatization are applicable within each transactional mode. For example, the system may require an object to quiesce before freeing it (i.e., to ensure that no transaction holds a lock on it in a particular STM mode). Such quiescing may be removed from the critical path of the application, for example by placing the object on a to-be-quiesced-and-freed list, which may be processed incrementally or in the background. Note that in some such embodiments, at least some mode changes may essentially require all transactions to quiesce, implying that all objects on such a list have quiesced. Therefore, at these mode changes, the list may be freed without checking each object to make sure it has quiesced.

Note that in the examples described above, because each hardware transaction reads modeIndicator to confirm that the system is executing in a compatible mode, changes to other fields of modeIndicator may abort the transaction. Therefore, in some embodiments it may be preferable to use separate variable(s) for change coordination, and to modify modeIndicator only when changing modes. For example, by keeping version numbers in other variables coordinated with a version number field in modeIndicator, it may be possible to arrange for all transitions except actual mode changes to affect other variables, and to only modify the modeIndicator variable that indicates the current mode when changing modes.

Note that the counters mustFinishThis, mustFinishNext, and otherTxns, described above, may introduce bottlenecks that inhibit scalability beyond a certain number of threads or cores if implemented naively. However, in general these counters need not support the ability to know the exact value of the counter, as provided by standard counters. Instead, it may be sufficient that they support Arrive, Depart, and Query operations, where the Query operation simply reports whether there is any transaction that has arrived and not yet departed. A so-called "Scalable Non-Zero Indicator" (SNZI) implementation may be used for this purpose. SNZI is described in detail in co-pending U.S. patent application Ser. No. 11/939,372, entitled "System and Method for Implementing Shared Scalable Nonzero Indicators," and naming Mark S. Moir, Yosef Lev, Victor M. Luchangco, and David Dice as inventors, which is herein incorporated by reference in its entirety. In various embodiments, SNZI exploits the fact that the required semantics in such application may be weaker than for standard counters to allow scalable and efficient implementations. SNZI specifically targets implementations in which the Query operation comprises a single read of a variable that will not change before the number of transactions that have arrived and not yet departed becomes zero or becomes nonzero. Using a SNZI implementation for the counters described herein may in some embodiments allow the above-described mode coordination scheme to be integrated with hardware schemes without unrelated events causing aborts of hardware transactions.

As noted above, various factors may help determine which transactional memory mode to use at a given time (e.g., for a given application, workload, etc.). For example, one consideration may be whether or not hardware transaction support is available, and/or the type or amount of such support. Information regarding what other transactional memory modes may have been used and which of those have succeeded or failed recently, as well as other dynamically determined information, may help determine which transactional memory mode is used and/or when it may be appropriate to change to another transactional memory mode. As noted above, decisions as to which transaction techniques to use and/or when to initiate a change of technique may be made at runtime by transactions themselves, or by a central mode manager, in different embodiments. In one embodiment, a transaction support library may provide various functions for implementing decisions regarding selection of and transitions to various transaction techniques. Additionally, in some embodiments, details regarding the particular environment in which an application is executing may affect which implementations or transaction techniques may or may not be available or appropriate for use at a given time. For example, some transaction techniques may not be usable when an application is executed in debug mode or when a breakpoint has been set within the set of atomic instructions. In other embodiments, certain transaction techniques may not be usable when the application is executed under particular environments. For instance, not all transaction techniques may be supported by all versions of an operating system or virtual machine.

In some embodiments, a compiler may generate code configured to support various alternative transaction techniques and the system may be configured to determine at runtime which of those techniques are supported or appropriate given the particular environment, workload, and/or execution mode of the application. Alternatively, a transaction support library may include functionality for determining whether or not particular transaction techniques are supported, available or appropriate based on execution environment, workload, and/or execution mode. In general, different sets of alternative code paths for implementing transactions may be available and compatible according to available hardware support, algorithmic techniques used in the alternative implementations, and runtime conditions, such as workload, potential or actual conflicts (or lack thereof) between transactions, or specific memory access patterns or other aspects of the particular transactions executed by an application.

Given the ability to switch between modes, a wide range of policies for deciding when to switch modes and to which mode is possible. In a simplistic example, different transactional memory modes may be "scheduled" into phases, e.g., so that a fixed amount of time is spent in each mode in order. However, improved performance may be achieved in most cases by monitoring, for example, congestion in the system, the progress of transactions, commit/abort rates, contention rates, utilization rates and/or overflow of store buffers, status of transactions with respect to the current mode, and/or other transaction performance measures and transitioning to a different transactional memory mode if a current mode does not meet targeted performance standards. For example, if almost all transactions succeed in HARDWARE mode, it may be preferable to spend a relatively large percentage of time in that mode. On the other hand, if a transaction is encountered that can never commit in HARDWARE mode, for example due to limitations of the HTM support, then the system must eventually be transitioned to a mode that can execute the transaction in software (e.g., either in SOFTWARE or HYBRID mode). Once such a transaction is encountered, depending on various factors, the system may in different embodiments wait for a short time to allow other transactions to accumulate that require a software mode, or may immediately initiate a transition to a software mode to avoid delaying the transaction.

Similarly, when the system is in a mode that supports software transactions, it may be appropriate to transition to HARDWARE mode, at some point, in order to achieve performance gains available by exploiting HTM support. Again, a number of factors, including programmer hints about the application or statistics collected (e.g., by a contention manager or mode manager modules) may influence this decision. In some embodiments, the system may minimally wait for completion of the transaction or transactions that triggered a transition from a hardware mode to a software mode, in order to avoid "thrashing" between modes. For example, a triggering transaction, if re-executed in hardware mode, may be likely to immediately trigger a return to a software mode, in some embodiments.

In some embodiments, special circumstances may allow the use of specialized (and possibly very simple and efficient) transactional memory modes for particular transactions or groups of transactions, as described above regarding the SEQUENTIAL and SEQUENTIAL-NOABORT modes. In such embodiments, if these special circumstances are detected (e.g., through the use of programmer hints, code marking, compiler directives, code optimizers, or through runtime determination by a contention manager and/or mode manager), the system may be configured to transition to these special modes for these transactions. The system may be configured to transition back to a more complex and/or less efficient mode when the special circumstances no longer apply. Note that any suitable policy may be applied to determine when and if to transition from one transactional memory mode to another, in different embodiments.

As noted above, in some embodiments, such as the one illustrated in FIG. 4, a decision to transition to a different transactional memory mode may be made as a result of a failure to execute a given transaction in a current mode. In some embodiments, the system may include, for example, instruction handlers for "transaction_begin," "transaction_end," and "transaction_abort" instructions provided by a compiler. In such embodiments, when a transaction fails, it may be retried, transparently to the software (possibly after a short delay to reduce contention). In other embodiments, a transaction may immediately branch upon failure to a "transaction_fail" handler address, specified with the corresponding transaction_begin instruction. This may allow software to decide how to react to failures, as needed by HyTM and PhTM. In some embodiments, a contention management mechanism may delay memory requests that conflict with a transaction, NACK'ing the processor that issued the request. In such embodiments, memory requests may be repeatedly NACK'ed for a very long time, until the transaction commits or aborts. This mechanism may complicate the hardware design beyond what may be assumed about a best-effort HTM. A typical best-effort HTM, for example, may use only on-chip caches and store buffers, and may abort transactions that exceed these resources or that encounter any conflict.

As previously noted, a phased transactional memory implementation may include multiple STM modes having different characteristics, in some embodiments. In addition, a hybrid transactional memory implementation may include one or more STM components corresponding to available STM-only modes or may include one or more STM components that are different than any available STM-only modes. For example, different approaches to read sharing may be more suitable for particular workloads and/or machine sizes than others. Therefore, in some embodiments the STM component of a HyTM implementation may use semi-visible reads, while in others the STM component may use invisible reads. A semi-visible read mechanism may record how many (but not which) transactions hold read ownership of a given location. Using semi-visible reads for HyTM may allow hardware transactions to detect conflicts with concurrent software transactions cheaply, and may also support an optimization that avoids iterating over the read set when validating a transaction. On the other hand, the semi-visible read counters used in such an implementation may be hotly contended under heavy read sharing. With an invisible read approach, each transaction may keep track of its reads privately, avoiding contention under heavy read sharing, but each transaction may be required to iterate over its read set for every validation. Other embodiments using invisible reads may instead use a global counter to ensure that reads are consistent.

A compiler supporting a phased transactional memory implementation may generate two or more code paths for each atomic block, each of which executes the block using a different transactional memory mode. Code generated by the compiler may call a special PhTM library function to decide which code path to take, based on the current mode, or to change the mode before proceeding. The PhTM compiler may include support for a "bare bones" hardware transaction mode, in some embodiments. For example, the compiler may support a call to a checkMode function in the PhTM library after the beginning of a hardware transaction to allow transactions executed using HTM to ensure that they run only in appropriate modes (such as the HARDWARE mode described above). If this function sees that the current transactional memory mode is not HARDWARE, it may abort the hardware transaction (which may then be retried). Otherwise, the transaction may proceed in HARDWARE mode. As noted above, if the mode changes before the hardware transaction completes, it will fail and retry.

As discussed, there may be no need in PhTM for a hardware transaction to check for conflicts with software transactions. Therefore, a PhTM compiler may support an option to disable generation of conflict checking calls in the hardware path. As described above, transactions executed using the software path may make calls into the library for beginning and committing software transactions, and for each memory access. Thus the system may use an STM implementation that does not include support for conflict checking by hardware transactions, in some embodiments. Additional functionality, such as the ability to self-abort a transaction and flattening (lexically and dynamically) of nested transactions, may be supported in some embodiments.

A PhTM compiler, or other translation tool, may construct code that allows multiple compatible transaction implementation techniques to be used by the same program at different times and may also produce additional code to coordinate decisions about which method to use under what circumstances. In some embodiments, programmers may write transaction code once using familiar coding styles, but the transaction may be effected according to one of a number of compatible alternative implementation techniques. Programmers may not need to write multiple versions of their code in order to exploit alternative implementation approaches, or even be specifically aware of the particular transaction implementations implemented. Instead the transaction code written by the programmer may translated, replaced or transformed into a code that is configured to implement transactions according to any of various transactional memory techniques in corresponding transactional memory modes. In some embodiments, the particular technique implemented for each transaction may not be decided until runtime, and may be different for different execution runs depending on the available resources, on available HTM support, and/or on the current workload, among other factors. At runtime, any of the various implemented techniques may be used to effect transactions, according to the current transactional memory mode, and if the first technique fails or is inappropriate for a particular transaction or group of transactions, the transactional memory mode may be changed and the transaction(s) retried.

Figure 6:
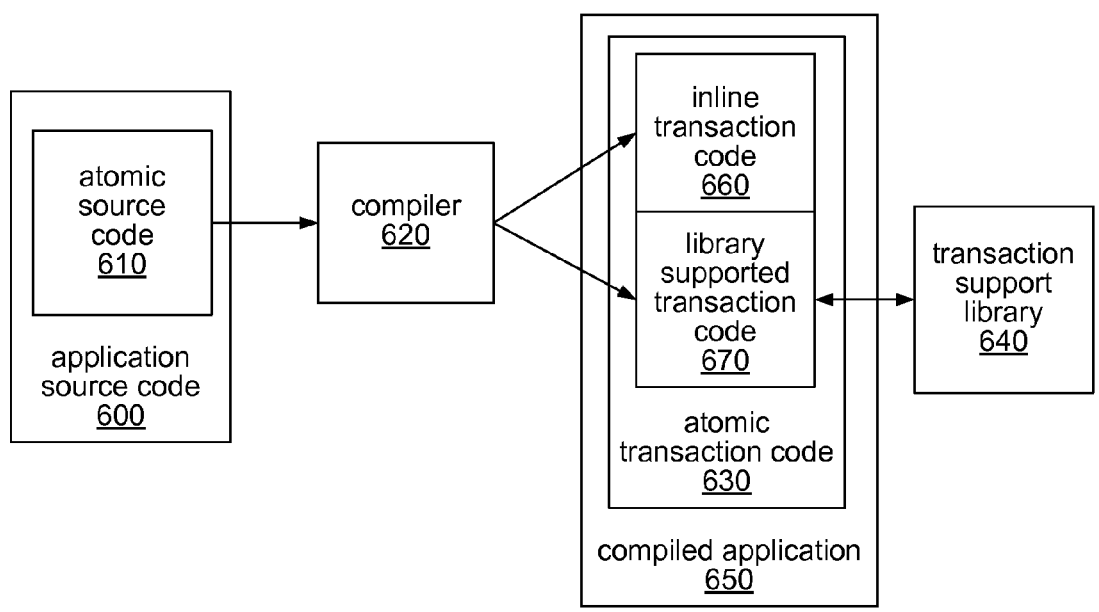
FIG. 6 is a block diagram illustrating a compiler generating inline transaction code, as described herein.

FIG. 6 is a block diagram illustrating a compiler 620 configured to analyze application source code 600, identify one or more sets of atomic source code 610 and then generate atomic transaction code 630 as part of compiled application 650, as described above. As described above, a PhTM compiler, such as compiler 620 may be configured to replace programmer written code, such as in atomic source code 610, that is to be executed atomically with alternate code configured to implement multiple code paths, each implementing a particular transaction technique for a corresponding transactional memory mode. For example, a programmer may write the source code for an application, such as application source code 600, using atomic blocks to specify sets of instructions that should be executed atomically and/or as a transaction. For example, the program may include sets of instructions to be executed atomically together within a set of curly brackets (e.g., "{ }") preceded by the term "atomic", thus indicating that the instructions within the brackets should be executed atomically.

Compiler 620 may, during the compilation of application source code 600, identify one or more sets of instructions to be executed atomically, such as by recognizing the atomic keyword, in one embodiment. In other embodiments, a programmer may use other or additional manners to indicate sets of instructions to be executed atomically. For example, in some embodiments, operations to be executed atomically may be designated using pairs of keywords, such as transaction_begin and transaction_end, to specify the beginning and end, respectively, of a group of operations. Thus, compiler 620 may be configured to identify sets of instructions or other fragments or portions of an application (e.g., functions, objects, method, classes, etc) by recognizing any of various language constructs that may be used to designate those instructions, fragments or portions to be executed atomically. A programmer may also use a particular language construct, such as an atomic keyword, to designate specific data structures, classes and/or objects that should be accessed using transactions. Thus, in some embodiments, compiler 620 may be configured to recognize such atomic structures, class and/or objects and generate code to ensure that they are accessed using transactions.

Additionally, compiler 620 may, in one embodiment, be configured to generate code configured to determine at runtime whether or not a particular set of instructions should be executed using a transaction (e.g., atomically). For example, compiler 620 may generate code configured to test a certain condition at runtime to determine whether or not a particular set of instructions should be executed using a transaction. Similarly, compiler 620 may, in some embodiments, be configured to generate code configured to determine the particular transactional memory mode in which to execute transactions and/or code configured to determine when and if to transition to a different transactional memory mode, as described above.

While described herein mainly in terms of a compiler, compiler 620 may also represent other entities configured to generate atomic transaction code 630, according to different embodiments. For instance, in one embodiment, compiler 620 may represent a code optimizer rather than a compiler. In another embodiment, compiler 620 may represent a just-in-time (JIT) compiler rather than a more standard compiler. In some embodiments, compiler 620 may represent an assembler rather than a compiler. In general, compiler 620 may represent any entity capable of and configured to generate atomic transaction code for implementing multiple, alternative transaction methods, as described herein. While described herein as various software entities, compiler 620 may, in some embodiments, represent a hardware-based entity configured to generate atomic transaction code for implementing multiple, alternative transaction methods.

Atomic source code 610 may represent code instructions in any of various languages, according to various embodiments. For example, in some embodiments, atomic source code 610 may represent code written in a high level programming language, such as C, C++, or Java™. In other embodiments, atomic source code 610 may represent binary instructions or assembly instructions. In yet other embodiments, atomic source code 610 may also represent compiler-intermediate instructions, virtual machine byte code instructions, such as Java™ byte code instructions.

Atomic transaction code 630 may represent the code generated by compiler 620 and atomic transaction code 630 may include multiple code paths, each implementing one particular transaction technique corresponding to a given transactional memory mode implementation. Atomic transaction code 630 may also include functionality to make various decisions regarding the execution of the different transaction techniques, such as which technique to use and/or when and if the system should transition from one transactional memory mode to another. Atomic transaction code 630 may also include functionality to maintain information regarding both current and past transactions to aid in making decisions regarding the execution of the different transaction techniques. Thus, as described herein, a programmer's source code indicating that certain instructions should be executed atomically may be translated, replaced or transformed into atomic transaction code 630 including, but not limited to, multiple code paths, decision making functionality regarding the transactional memory mode in which to execute, and functionality for maintaining information to support the decision making functionality.

In some embodiments, atomic transaction code 630 may be configured to include all the various code paths for implementing the different transaction techniques, as well as the decision-making functionality inline, such as in inline transaction code 660. In other embodiments, however, atomic transaction code 630 may be configured to utilize and/or include a library of transaction enabling code, such as transaction support library 640. Thus, in some embodiments, compiler 620 may be configured to generate inline transaction code 660 that includes all the various code paths and functionality to implement the different transaction techniques, as illustrated in FIG. 6.

Transaction support library 640 may include the actual functionality to execute transactions according to the various transaction techniques. Additionally, transaction support library 640 may include functionality to make decisions regarding which technique to use at any given time. Thus, in some embodiments, compiler 620 may be configured to generate atomic transaction code 630 to include library supported transaction code 670 configured to call functions provided by transaction support library 640 to determine which transaction technique to use and also call functions provided by transaction support library 640 to implement that transaction technique. In other words, atomic transaction code 630 may be configured to provide a framework for enabling transactional memory mode decisions and the implementation of transaction techniques by transaction support library 640.

Note that in various embodiments, compiler 620 may be configured to generate both inline transaction code 660 and library supported transaction code 670 in atomic translation code 630, as illustrated by FIG. 6. For example, inline transaction code 660 may be configured to implement certain transaction techniques, such as a default transaction technique, while library supported transaction code 670 may be configured to implement other transaction techniques, as needed. Additionally, when atomic transaction code 630 includes both inline transaction code 660 and library supported transaction code 670, different parts of transaction techniques may be performed by inline transaction code 660 or by library supported transaction code 670, according to various embodiments.

For example, in some embodiments, library supported transaction code 660 may be configured to call functions provided by transaction support library 640 to determine which transaction technique to use, while inline transaction code 660 may include the functionality for implementing that transaction technique as one of the multiple code paths generated by compiler 620.

As described above, a wide variety of information may be used, either by inline transaction code 660 or a by transaction support library 640, to determine which transaction technique to use at any given time. For example, information regarding which transaction techniques have already been used and information regarding the success, failure, or performance of previous uses of particular transaction techniques are examples of information that may be used, at least in part, to determine which particular transaction technique to use at any given time. Additionally, inline transaction code 660 and/or transaction support library 640 may be be configured to gather, record and/or maintain information regarding transaction attempts for use in subsequent decisions regarding which transaction technique to use at any given time. In various embodiments in which different transactional memory modes are used during different scheduled phases, code implementing a timer and/or a scheduling function may be included in inline transaction code 660 and/or transaction support library 640.

In some embodiments, a hardware transaction technique may support particular I/O functionality as part of the transaction. In other embodiments, particular transaction techniques may not support particular functions or system calls, I/O calls, or certain memory access patterns. However, the application code that includes the unsupported instructions may not be executed every time the application is run. For example, within an atomic block, the unsupported code may only execute under certain conditions. In other words, the code in the atomic block may include one or more conditional branches only one of which may result in execution of the unsupported code. Thus, in some embodiments, atomic transaction code 630 may be configured to start the transaction using a transaction technique that does not support the unsupported code, such as to use faster hardware transaction techniques for those cases in which the unsupported code will not be executed, but to transition to a different mode and execute the transaction using another technique if and when the unsupported code is executed.

In another example, atomic transaction code 630 may be configured to determine whether or not the transaction involves functionality not supported by a hardware transaction technique. If the transaction does involve functionality not supported by the hardware transaction technique, atomic transaction code 630 may be configured to initiate a transition to a different transaction technique for executing the transaction. Additionally, atomic transaction code 630 may be configured to clean up or end the current transaction technique before executing transactions using a new transaction technique, as described above. Please also note that in some embodiments, compiler 620 may be configured to determine whether or not a transaction, such as specified in an atomic block, involves code that is not supported by a particular transaction technique and to generate atomic transaction code 630 such that the particular transaction technique is not attempted for that transaction.

Additionally, a function provided by transaction support library 640 to determine which transaction technique to use may also include parts of the implementation of particular transaction techniques. For example, in one embodiment, a function called by atomic transaction code 630 to determine which transaction technique to use may also include functionality to manage a transition to another transactional memory mode, as described above. As described above, atomic transaction code 630 may, in some embodiments, be configured to attempt a particular transaction technique multiple times until the transaction succeeds, while in others one or more failures of a given transaction technique may trigger a transition to a different transactional memory mode.

Please note that as described herein atomic transaction code 630 may include inline transaction code 660, library supported transaction code 670 or both, according to various embodiments. Thus, functionality described herein as being performed by atomic transaction code 660 may be performed by inline transaction code 660 in some embodiments and by library supported transaction code 670 in other embodiments. For example, in some embodiments, inline transaction code 660 may include the functionality to begin and end transactions according to various transaction techniques. In other embodiments, however, library supported transaction code 670 may be configured to call one or more functions of transaction support library 640 to begin and end transactions.

Figure 7:
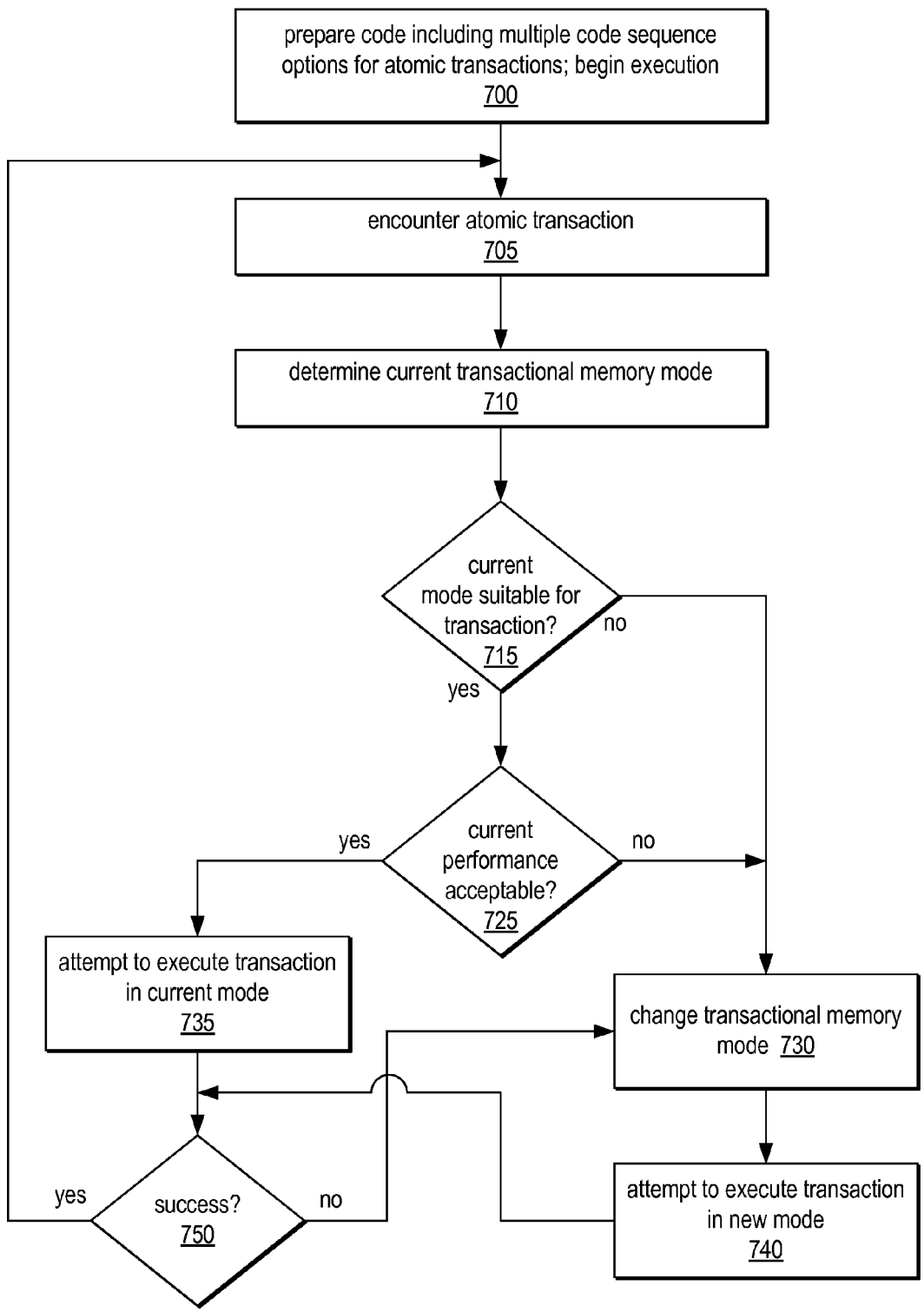
FIG. 7 is a flowchart illustrating one embodiment of a method for implementing multiple, alternative methods for executing transactions, as described herein.

FIG. 7 is a flowchart illustrating one embodiment of a method for implementing multiple, alternative transaction methods in a phased transactional memory implementation. As described above, a programmer may write code specifying that certain operations, functions, etc., should be executed atomically, as a transaction. Please note that in some embodiments, the operations may not actually be executed atomically, but may appear to be executed atomically to other processes or threads also executing the same system. When generating a compiled version of an application including the source code, a PhTM compiler, such as compiler 620, may analyze the programmer's source code and rather than directly compiling the transaction code written by the programmer, may generate code configured to implement multiple, alternative transaction methods, each corresponding to a respective transactional memory mode. At runtime, execution may begin using one of the available transactional memory modes. The preparation of multiple code sequences and the beginning of the execution of the application are illustrated in FIG. 7 as element 700.

As illustrated by element 705 in FIG. 7, an atomic transaction may be encountered during execution of the application. In some embodiments, each time a transaction is encountered, a determination may be made of the current transactional memory mode, as in 710. As described above, a shared variable (e.g., a field of a modeIndicator variable) may be used to indicate the current (and, in some embodiments, the next) transactional memory mode. Therefore, determining the current transactional memory mode may involve the transaction reading the value of such a shared variable, e.g., using a checkMode function, as described above.

As shown in FIG. 7, in some embodiments, the method may include determining if the current mode is suitable for the encountered transaction, as in 715. This determination may be made by the transaction itself or by a mode manager, for example, using any of the methods described herein, or using any other suitable mechanisms, in different embodiments. If the current mode is not suitable for the encountered transaction, shown as the negative exit from 715, the transaction (or mode manager) may trigger a change of the transactional memory mode, as in 730. In addition, in some embodiments, the method may include determining if the current transaction performance is acceptable, as in 725. Again, in different embodiments this determination may be made by the transaction itself, or by a mode manager, as described above. If the performance is not acceptable, shown as the negative exit from 725, the transaction (or mode manager) may trigger a change of the transactional memory mode, as in 730. Note that determining if the current mode is suitable for a given transaction and/or determining if current performance is acceptable may be performed by code included in application code, such as inline transaction code 660 or library supported transaction code 670 of atomic transaction code 630, or by code included in a function called by application code, such as a function included in transaction support library 640, in different embodiments.

If the current transactional memory mode is suitable for the encountered transaction and the current performance is acceptable, shown as the positive exit from both 715 and 725, the method may include attempting to execute the encountered transaction in the current mode, as in 735. After executing the instructions of the transaction, atomic transaction code 630 may then attempt to commit the hardware transaction. As with beginning the transaction, atomic transaction code 630 may be configured to call one or more functions provided by transaction support library 640 to commit the hardware transaction, according to some embodiments. In other embodiments, atomic transaction code 630 may include the code to commit the hardware transaction inline.

If the transaction succeeds, shown as the positive exit from 750, the method may include completing any processing regarding the current transaction, such as recording information regarding the success of the transaction, and then continuing normal execution. In this case, the operations illustrated at 705-750 may be repeated when another transaction is encountered during execution. This is shown as the feedback loop from 750 to 705. If the transaction does not succeed, shown as the negative exit from 750, a change of transactional memory mode may be initiated, as in 730. Any of the various mechanisms for changing transactional memory modes and coordinating the transitions between transactional memory modes described herein may be used to perform the transition illustrated in 730, according to different embodiments. Once the transactional memory mode has been changed, the method may include attempting to execute the encountered transaction in the new transactional memory mode, as in 740. If the transaction fails to successfully complete, shown as the negative exit from 750, the method may again include initiating a change to yet another transactional memory mode and retrying the transaction, shown as the feedback loop from 750 to 730 and 740, in this example. Note that, as described above, rather than immediately initiating a change of transactional memory mode upon a transaction failure (or upon determining that the current mode is not suitable for a given transaction or that the current performance is not acceptable), the method may include retrying the transaction one or more times and/or waiting for some time before retrying the transaction or changing the transactional memory mode, in different embodiments (not shown). Also note that in some embodiments, atomic transaction code 630 may retry a transaction by just re-attempting to commit the transaction without having to begin the entire transaction over again.

When determining, at runtime, a transaction technique to which execution should be transitioned (e.g., prior to changing the transactional memory mode at 730), various factors or types of information may be involved. For example, if current performance does not meet target levels, atomic transaction code 630 may be configured to determine whether or not the system on which the application is being executed includes hardware-based transactional memory. If so, atomic transaction code 630 may decide to transition the system to an HTM-only mode, such as the HARDWARE mode described above. In other embodiments, atomic transaction code 630 may analyze information regarding previous transaction attempts when determining which transaction technique to use. For instance, if a particular transaction technique has failed or had to be aborted previously, atomic transaction code 630 may be configured to not select that particular transaction technique, according to one embodiment. Other types of information may also be used when determining which transaction technique to use, as described in more detail herein.

Attempting a transaction in the current or new transactional memory mode may involve beginning the transaction, performing one or more instructions to be executed atomically, such as I/O instructions, shared memory instructions, communication instructions, and verifying that no other code has performed any instructions that would prevent the transaction from being committed. For example, if the current transaction involves a modification of shared memory, atomic transaction code 630 may verify that no other code, such as may be executing in another thread, is also executing instructions to modify the same location in shared memory. If so, atomic transaction code 630 may abort the current transaction, causing it to fail.

Note that in some embodiments, atomic transaction code 630 may be configured to always attempt one transaction technique first. For example, in some embodiments, the execution environment may be configured such that the transactional memory mode is initialized to a default transactional memory mode for some or all applications, and the transactional memory mode may only be changed to another mode in the case of failures, performance issues, and/or resource issues (e.g., contention, lack of suitable HTM support, etc). In such embodiments, as long as the default transaction technique succeeds, atomic transaction code 630 may be configured to continue normal code execution. If, however, the default transaction technique is not successful or must be aborted, atomic transaction code 630 may be configured to determine another transaction technique to attempt, as described above. In one embodiment, compiler 620 may be configured to generate atomic transaction code 630 such that atomic transaction code 630 is configured to first attempt only hardware transactions (e.g., by initializing the current mode to HARDWARE) and if that fails to transition to a transactional memory mode supporting software transactions (e.g., the SOFTWARE or HYBRID modes described above). In other embodiments, atomic transaction code 630 may be configured to retry the default transaction technique one or more times before initiating a transition to a different mode, as described above regarding FIG. 7.

As described above, various factors may be involved in determining whether or not to try a default transaction technique and how many times the default transaction technique should be attempted. For instance, in some embodiments, compiler options set by the programmer or runtime options configured by a user (such as an administrator) may specify whether or not a particular technique, such as a hardware technique, should be used as a default technique and attempted first. Additionally, the programmer and/or user may be able to specify how many times a default technique should be attempted. In other embodiments, runtime factors, such as whether or not the default technique has been successful on previous transactions, or information regarding the particular type of transaction (e.g., I/O, shared memory, network communications, etc.), may be used to determine whether or not, and how many times, to attempt a default transaction technique. Additionally, in some embodiments, such decisions may be made inline by atomic transaction code 630 generated by compiler 620 while in other embodiments, atomic transaction code 630 may be configured to call a function from a support library, such as transaction support library 640 to determine whether or not to initialize the system to attempt a given transactional memory technique first (e.g., as a default transactional memory mode).

Note that in some embodiments, atomic transaction code 630 may be configured to continue alternating between various techniques, possibly trying each technique multiple times (i.e., during different phases), until all transactions complete successfully. Also note that while described above in terms of a hardware transaction technique and a software transaction technique, the method illustrated by FIG. 7, may be implemented regarding any two transaction techniques, whether hardware-based, software-based or both. For example, the method illustrated by FIG. 7 may be implemented regarding two software-based transaction techniques, in one embodiment. Additionally, in some embodiments, the method of FIG. 7 may be extended to work with more than two transaction techniques. For example, when one transaction technique fails, atomic transaction code 630 may be configured to determine a next transaction technique to try, as described above regarding the hardware and software transaction techniques.

Figure 8:
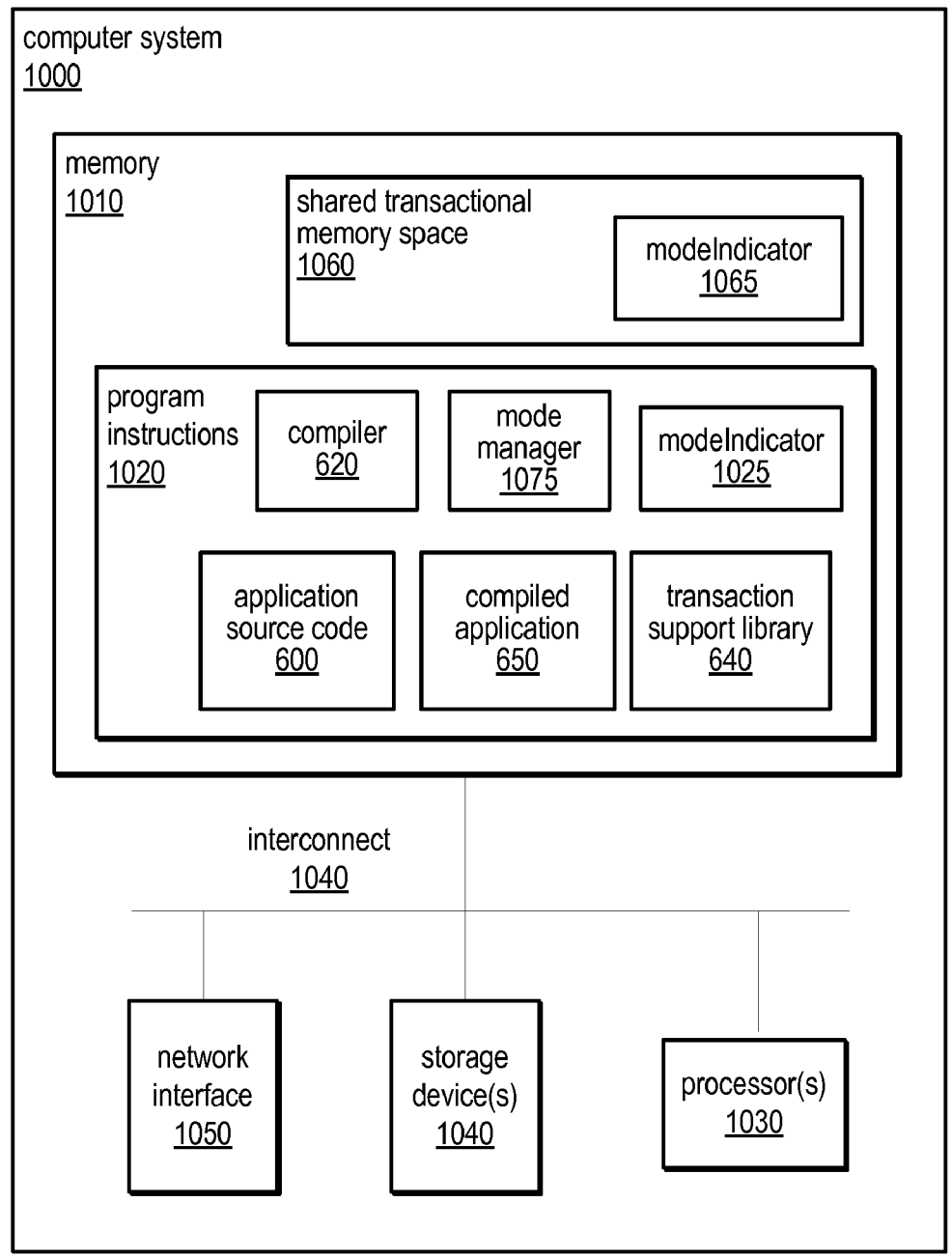

FIG. 8 illustrates a computing system capable of implementing compiler based support for multiple, alternative methods for implementing transactions, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1030 (possibly including multiple processors, a single-threaded processor, a multi-threaded processor, a multi-core processor, etc.). The computer system 1000 also includes one or more system memories 1010 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and one or more storage device(s) 1040 (e.g., optical storage, magnetic storage, etc.). The memory medium may include other types of memory as well, or combinations thereof. Embodiments of the invention may include fewer or additional components not illustrated in FIG. 8 (e.g., video cards, audio cards, additional network interfaces, peripheral devices, etc.). The processor unit 1030, the storage device(s) 1040, the network interface 1050, and the system memory 1010 are coupled to the system interconnect 1040. One or more of the system memories 1010 may embody a compiler configured to provide multiple, alternative methods for implementing atomic transactions. Additionally, one or more of the system memories 1010 may embody an application including code specifying one or more atomic transactions.

In some embodiments, memory 1010 may include program instructions 1020 configured to implement a compiler, such as compiler 620, configured to provide multiple, alternative methods for implementing atomic transactions, as described herein. Additionally, program instructions 1020 may comprise application source code 600 including code configured to request or specify atomic transactions, as well as compiled application 650, as described herein. Program instructions 1020 may also be configured to implement a transaction support library 640, configured to provide multiple, alternative methods for implementing atomic transactions, as described herein. As illustrated in FIG. 8, program instructions 1020 may in some embodiments include a central mode manager module, such as mode manager 1075, and/or one or more storage locations configured to store values of one or more fields of a mode indicator variable, such as modeIndicator 1065. Compiler 620, application source code 600, compiled application 650, and/or transaction support library 640 may each be implemented in any of various programming languages or methods. For example, in one embodiment, compiler 620 and transaction support library 640 may be JAVA based, while in another embodiments, they may be written using the C or C++ programming languages. Similarly, application 610 may be Java, C, or C++, among other programming languages, according to various embodiments. Moreover, in some embodiments, compiler 620, transaction support library 640, and application 610 may not be implemented using the same programming language. For example, application 610 may be C++ based, while compiler 620 may be developed using C.

As illustrated in FIG. 8, memory 1010 may also include a shared transactional memory space 1060, which may support and/or be accessed using STM, HTM, and/or HyTM transactions, in different embodiments. In some embodiments, one or more storage locations for the values of various fields of a mode indicator variable, such as modeIndicator 1065, may be included in shared memory space 1060, rather than in program instructions 1020.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
performing, by a computer:
executing, in an execution environment, a plurality of transactions in a first transactional memory mode, wherein while in said first transactional memory mode all transactions executed in the execution environment are executed according to a particular transactional memory implementation;
dynamically transitioning to a second transactional memory mode during runtime; and
in response to said dynamically transitioning:
executing a plurality of transactions in the second transactional memory mode, wherein while in said second transactional memory mode all transactions executed in the execution environment are executed according to a different transactional memory implementation than in the first transactional memory mode;
wherein said particular transactional memory implementation and said different transactional memory implementation respectively provide for atomic execution of respective sequences of instructions with respect to a shared transactional memory space.

2. The method as recited in claim 1, wherein at least one of said particular transactional memory implementation or said different transactional memory implementation comprises a software transactional memory implementation in which conflicts in the shared transactional memory space between transactions are resolved by a software implementation without hardware support.

3. The method as recited in claim 1, wherein either said particular transactional memory implementation or said different transactional memory implementation is a hardware transactional memory implementation in which conflicts in the shared transactional memory space between transactions are resolved by a hardware implementation.

4. The method as recited in claim 1, wherein either said particular transactional memory implementation or said different transactional memory implementation is a hybrid transactional memory implementation in which some conflicts in the shared transactional memory space between transactions are resolved by a software implementation without hardware support and other conflicts in the shared transactional memory space between transactions are resolved by a hardware implementation.

5. The method as recited in claim 1, further comprising:
dynamically transitioning to a third transactional memory mode during runtime; and
in response to dynamically transitioning to a third transactional memory mode:
executing one or more transactions in the third transactional memory mode, wherein while in said third transactional memory mode all transactions executed in the execution environment are executed according to a third transactional memory implementation distinct from said particular transactional memory implementation and from said different transactional memory implementation;

wherein said third transactional memory implementation provides for atomic execution of a respective sequence of instructions with respect to the shared transactional memory space.

6. The method as recited in claim 1, wherein said dynamically transitioning to a second transactional memory mode comprises:

prior to said executing a plurality of transactions in the second transactional memory mode, ensuring that transactions currently executing in the first transactional memory mode will not interfere with correct execution of transactions to be executed in the second transactional memory mode.

7. The method as recited in claim 6, wherein said ensuring comprises waiting until all of the transactions executing in the first transactional memory mode complete execution, are aborted, or reach a safe transition point during their execution.

8. The method as recited in claim 1, wherein said dynamically transitioning to a second transactional memory mode comprises:

modifying a value of at least one field of a global mode indicator to indicate a transition to the second transactional memory mode.

9. The method as recited in claim 1, wherein said particular transactional memory implementation is a hardware transactional memory implementation in which conflicts in the shared transactional memory space between transactions are resolved by a hardware implementation; and wherein said dynamically transitioning to a second transactional memory mode comprises modifying a value of at least one field of a global mode indicator to indicate a transition to the second transactional memory mode;

the method further comprising aborting one or more transactions currently executing in said first transactional memory mode in response to said modifying.

10. The method as recited in claim 1, wherein said particular transactional memory implementation is a software transactional memory implementation in which conflicts in the shared transactional memory space between transactions are resolved by a software implementation without hardware support;

the method further comprising:

subsequent to said dynamically transitioning, preventing transactions not currently executing in said first transactional memory mode from beginning execution in said first transactional memory mode; and prior to said executing a plurality of transactions in the second transactional memory mode:

aborting any transactions currently executing in said first transactional memory mode that are not in a committed state; and waiting for completion of any transactions currently executing in said first transactional memory mode that are in a committed state.

11. The method as recited in claim 1, further comprising, prior to said dynamically transitioning:

determining that the execution environment should transition to the second transactional memory mode;

wherein said determining is dependent on one or more of: a scheduled phase for the second transactional memory mode, current workload characteristics, a current transaction performance measurement, a prior transaction performance measurement, or availability of hardware support for transactions.

12. The method as recited in claim 1, further comprising:

preparing an executable functional sequence corresponding to a source representation of code that includes a plurality of transaction constructs, and including in the executable functional sequence two alternative functional encodings corresponding to each transaction construct;

wherein a first alternative functional encoding for each transaction construct is configured to implement executing a transaction indicated by the transaction construct in said first transactional memory mode, and a second alternative functional encoding for each transaction construct is configured to implement executing the transaction indicated by the transaction construct in said second transactional memory mode.

13. A system, comprising:

one or more processors; and a memory coupled to the one or more processors and comprising a shared transactional memory space accessible by transactions included in one or more threads executing on the one or more processors using a plurality of transactional memory implementations;

wherein the memory further comprises program instructions executable by the one or more processors to implement:

executing a plurality of transactions in a first transactional memory mode, wherein while in said first transactional memory mode all transactions executed in the execution environment are executed according to a particular transactional memory implementation;

dynamically transitioning to a second transactional memory mode during runtime; and in response to said dynamically transitioning:

executing a plurality of transactions in the second transactional memory mode, wherein while in said second transactional memory mode all transactions executed in the execution environment are executed according to a different transactional memory implementation than in the first transactional memory mode;

wherein said particular transactional memory implementation and said different transactional memory implementation respectively provide for atomic execution of respective sequences of instructions with respect to the shared transactional memory space.

14. The system as recited in claim 13, wherein the plurality of transactional memory implementations comprises two or more of: a first software transactional memory implementation in which conflicts in the shared transactional memory space between transactions are resolved by a software implementation without hardware support, a second software transactional memory implementation in which conflicts in the shared transactional memory space between transactions are resolved by a software implementation without hardware support, a hardware transactional memory implementation in which conflicts in the shared transactional memory space between transactions are resolved by a hardware implementation, and a hybrid transactional memory implementation in which some conflicts in the shared transactional memory space between transactions are resolved by a software implementation without hardware support and other conflicts in the shared transactional memory space between transactions are resolved by a hardware implementation.

15. The system as recited in claim 13, wherein in said dynamically transitioning, the program instructions are further executable by the one or more processors to implement:
prior to said executing a plurality of transactions in the second transactional memory mode, ensuring that transactions currently executing in the first transactional memory mode will not interfere with correct execution of transactions to be executed in the second transactional memory mode.

16. The system as recited in claim 13,
wherein in said dynamically transitioning, the program instructions are further executable by the one or more processors to implement modifying a value of at least one field of a global mode indicator to indicate a transition to the second transactional memory mode;
wherein in response to said modifying initiating a transition from a first transactional memory mode corresponding to a hardware transactional memory implementation to the second transactional memory mode, the program instructions are further executable by the one or more processors to implement aborting one or more transactions currently executing in said first transactional memory mode; and
wherein in response to said modifying initiating a transition from a first transactional memory mode corresponding to a software or hybrid transactional memory implementation to the second transactional memory mode, the program instructions are further executable by the one or more processors to implement:
subsequent to said dynamically transitioning, preventing transactions not currently executing in said first transactional memory mode from beginning execution in said first transactional memory mode; and
prior to said executing a plurality of transactions in the second transactional memory mode:
aborting any transactions currently executing in said first transactional memory mode that are not in a committed state; and
waiting for completion of any transactions currently executing in said first transactional memory mode that are in a committed state.

17. A non-transitory, computer-readable storage medium storing program instructions that when executed on one or more computers cause the one or more computers to perform:
executing, on behalf of an application, a plurality of transactions in a first transactional memory mode, wherein while in said first transactional memory mode all transactions executed on behalf of the application are executed according to a particular transactional memory implementation;
dynamically transitioning to a second transactional memory mode during runtime of the application; and
in response to said dynamically transitioning:
executing a plurality of transactions in the second transactional memory mode, wherein while in said second transactional memory mode all transactions executed on behalf of the application are executed according to a different transactional memory implementation than in the first transactional memory mode;
wherein said particular transactional memory implementation and said different transactional memory implementation respectively provide for atomic execution of respective sequences of instructions with respect to a shared transactional memory space.

18. The storage medium of claim 17, wherein in said dynamically transitioning to a second transactional memory mode, the program instructions further cause the one or more computers to perform:
modifying a value of at least one field of a global mode indicator to indicate a transition to the second transactional memory mode; and
prior to said executing a plurality of transactions in the second transactional memory mode, ensuring that transactions currently executing in the first transactional memory mode will not interfere with correct execution of transactions to be executed in the second transactional memory mode;
wherein said ensuring comprises waiting until all of the transactions executing in the first transactional memory mode complete execution, are aborted, or reach a safe transition point during their execution.

19. The storage medium of claim 17, wherein each of the first transactional memory implementation and the second transactional memory implementation comprise a different one of: a first software transactional memory implementation in which conflicts in the shared transactional memory space between transactions are resolved by a software implementation without hardware support, a second software transactional memory implementation in which conflicts in the shared transactional memory space between transactions are resolved by a software implementation without hardware support, a hardware transactional memory implementation in which conflicts in the shared transactional memory space between transactions are resolved by a hardware implementation, and a hybrid transactional memory implementation in which some conflicts in the shared transactional memory space between transactions are resolved by a software implementation without hardware support and other conflicts in the shared transactional memory space between transactions are resolved by a hardware implementation.

20. The storage medium of claim 17, wherein when executed on the one or more computers the program instructions further cause the one or more computers to perform:
preparing an executable functional sequence corresponding to a source representation of the application including a plurality of transaction constructs, and including in the executable functional sequence two alternative functional encodings corresponding to each transaction construct;
wherein a first alternative functional encoding for each transaction construct is configured to implement executing a transaction indicated by the transaction construct in said first transactional memory mode, and a second alternative functional encoding for each transaction construct is configured to implement executing the transaction indicated by the transaction construct in said second transactional memory mode.

\* \* \* \* \*